(12) United States Patent
Nashimoto et al.

(10) Patent No.: US 6,307,996 B1
(45) Date of Patent: Oct. 23, 2001

(54) OPTICAL WAVEGUIDE DEVICE AND MANUFACTURING METHOD THEREOF

(75) Inventors: Keiichi Nashimoto; Koichi Haga; Masao Watanabe; Hiroaki Moriyama; Takashi Morikawa; Shigetoshi Nakamura, all of Nakai-machi (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 09/184,041

(22) Filed: Nov. 2, 1998

(30) Foreign Application Priority Data

Nov. 6, 1997 (JP) .................................................. 9-320332
Aug. 25, 1998 (JP) ................................................ 10-238776

(51) Int. Cl.$^7$ .................................................. G02B 6/124
(52) U.S. Cl. ............................ 385/130; 385/14; 385/141
(58) Field of Search ................................ 385/14, 31, 33, 385/129–132, 141, 142, 144

(56) References Cited

U.S. PATENT DOCUMENTS

| 4,403,825 | * | 9/1983 | Tangonan et al. ...................... 385/14 |
| 4,856,861 | * | 8/1989 | Miyawaki et al. .................... 385/129 |
| 5,802,223 | * | 9/1998 | Nashimoto ......................... 385/36 X |

FOREIGN PATENT DOCUMENTS

| 3-291604 | 12/1991 | (JP) . |
| 7-78508 | 3/1995 | (JP) . |

OTHER PUBLICATIONS

Tsai, C.S. and P.Le, "4X4 Nonblocking Integrated Acousto–Optic Space Switch," Appl. Phys. Lett, vol. 60, Jan. 1992, pp. 431–433.
Chen, Qibiao et al., "Guided–Wave Electro–Optic Beam Deflector Using Domain Reversal in LiTaO$_3$," Journal of Lightwave Technology, vol. 12, No. 8, Aug. 1994, pp. 1401–1403.
Nishihara, Haruna and Narahara, "Optical Integrated Circuit," Ohmsha, 1993, pp. 291–304.

* cited by examiner

Primary Examiner—John D. Lee
(74) Attorney, Agent, or Firm—Oliff & Berridge PLC

(57) ABSTRACT

In an optical waveguide device, a laser beam is collected to an end face of a channel waveguide, and introduced into a PLZT thin film optical waveguide. The incident laser beam, when emitted from the channel waveguide, diverges in the PLZT waveguide, permeates a thin film lens and is collimated into 0.4 Mm size. When a high frequency voltage is not applied to a comb Al electrode, the laser beam is collected after penetrating through the second thin film and emitted from the end face through the channel waveguide to form an emission beam. When the high frequency voltage is applied to the comb Al electrode, a diffraction grating is formed by an acousto-optic effect, and the laser beam is deflected. The deflected laser beam, when penetrating through the second thin film lens, is collected and emitted from the end face through the channel waveguide in adjacent with the above-described channel waveguide to form a deflected emission beam.

25 Claims, 9 Drawing Sheets

OPTICAL WAVEGUIDE DEVICE AND MANUFACTURING METHOD THEREOF

BACKGROUND OF THE INVENTION

1. Field of the Invention

The present invention relates to an optical waveguide device having an optical waveguide of a ferroelectric thin film and a thin film lens for controlling a laser beam incident to the optical waveguide, and it has an application use in general optical integrated devices including, for example, optical deflection devices used for laser printers, digital copying machines and facsimile units optical switches and optical modulation devices used for optical communication and optical computers, and pick-up devices used for optical discs.

2. Prior Art

For disposing a deflection device, a switching or modulation device for a laser beam in an optical waveguide to constitute an optical integrated circuit device, it is important to form an electrode for deflection, switching or modulation to the optical waveguide, as well as use a waveguide lens for collimating a laser beam incident to the optical waveguide, and deflecting, switching or modulating and then collecting the laser beam. Particularly, the waveguide lens is an indispensable element in an optical deflection device using a planar waveguide.

As an optical deflection device using a planar optical guide, an optical deflection device utilizing an acousto-optical effect is disclosed, for example, in C. S. Tsai and P. Le, Appl. Phys. Lett. vol. 60 (1992) 431 (hereinafter referred to as literature (1)), in which a comb electrode for exciting surface elastic waves is disposed on the surface of an optical waveguide for Bragg diffraction of an optical beam in the optical waveguide and deflection is conducted by sweeping the frequency of the surface elastic waves. Further, in a prism optical deflection device using an electro-optical effect, a prismatic electrode is disposed on the surface of the optical waveguide, and the refractive index of the optical waveguide below the electrode is changed by the application of a voltage to deflect the optical beam in the optical waveguide as disclosed, for example, in Q. Chen, et al., J. Lightwave Tech. vol. 12 (1994) 1401 (hereinafter referred to as literature (2)).

As the material for the planar waveguide, glass such as quartz, oxide ferroelectrics such as $LiNbO_3$, polymers such as PMMA or GaAs series compound semiconductors are used. Among them, the ferroelectric oxide materials such as $LiNbO_3$ have good acousto-optic effect or electro-optical effect, and made of devices manufactured actually utilizing the effects described above are composed of $LiNbO_3$, and an optical deflection device utilizing the acousto-optical effect and the prism deflector utilizing the electro-optical effect are shown in the literatures (1) and (2), respectively.

In addition to $LiNbO_3$, there are various ferroelectrics such as $BaTiO_3$, $PbTiO_3$, $Pb_{1-x}La_x(Zr_yTi_{1-y})_{1-x/4}O_3$ (PZT, PLT, PLZT depending on the values for x and y), $Pb(Mg_{1/3}Nb_{2/3})O_3$, $KNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$ and $K_3Li_2Nb_5O_{15}$ and most of the materials described above have more satisfactory characteristics than $LiNbO_3$. Particularly, $Pb_{1-x}La_x(Zr_yTi_{1-y})_{1-x/4}O_3$ has been known as a material to provide an electro-optical coefficient much higher than that of $LiNbO_3$. While the $LiNbO_3$ single crystal has an electro-optical coefficient of 30.9 pm/V, PLZT (8/65/35:x=8%, y=65%, 1-y=35%) ceramics can provide an electro-optical coefficient of 612 pm/V.

While there are a lot of ferroelectrics having more satisfactory characteristics than $LiNbO_3$, $LiNbO_3$ is used in most of actually manufactured devices. This is chiefly because a thin film had to be grown epitaxially excepting for $LiNbO_3$, for which the optical waveguide technique was established based on the single crystal growing technique and the Ti diffusion and proton exchange to a wafer thereof, so that a thin film optical waveguide could not be manufactured with a quality at a practical level by existent vapor phase growing, and because there was no available technique for manufacturing a waveguide lens even if the thin film optical waveguide per se could be manufactured. On the contrary, the present inventors have already invented a method of manufacturing a thin film optical waveguide with a quality at a practical level by the solid phase epitaxial growing technique, with respect to the manufacture of the thin film optical waveguide with a quality at a practical level, disclosed the relevant invention in Japanese Published Unexamined Patent Application No. Hei 7-78508 and overcome the problem that the optical waveguide with the quality at the practical level could not be manufactured.

Meanwhile, the waveguide lens can be classified into five systems, namely, Mode index, Luneburg, Geodesic, Fresnel and Grating system, which are shown in the literature (Optical Integrated Circuit, by Nishihara, Haruna and Narahara, published from Ohmsha (1993) pp. 291–304).

In the mode index lens, regions each having an effective refractive index which is different stepwise are formed in a waveguide, and known methods of forming the difference of the effective refractive index include (1) a method of utilizing the difference of the thickness in the lens shape, (2) a method of coating a lens-shaped high refractive index layer, (3) a method of burying a lens-shaped high refractive index layer, (4) a method of conducting diffusion or ion exchange of other elements in a lens shape in the waveguide and (5) a method of patterning a portion of the waveguide into a lens shape and then refill the pattern into a flat shape by other materials. Since the planar process can be utilized for the lens, it can provide high mass productivity and even a non-spherical shape can also be manufactured easily.

However, in the method (1) of utilizing the difference of the thickness, the method (2) of coating the high refractive index layer and the method (3) of burying the high refractive index layer, coupling loss tends to be increased in principle, due to the presence of the step, by scattering at a lens boundary, lowering of overlap integral value and conversion of mode. The method (4) of conducting diffusion or ion exchange of other elements in the waveguide and the method (5) of patterning a portion of the waveguide and then refilling by use of other materials are suitable to the manufacture of a satisfactory waveguide lens.

However, a method of conducting diffusion or ion exchange of other element is not available for the material other than $LiNbO_3$, particularly, for $Pb_{1-x}La_x(Zr_yTi_{1-y})_{1-x/4}O_3$. Further, Japanese Published Unexamined Patent Application No. Hei 3-291604, etc. show a method of refilling an SiON optical waveguide made of glass material disposed on quartz glass with other materials by a lift off method after etching. However, there is no available method for selectively applying etching without giving surface roughness which would lead to the scattering loss in the optical waveguide of single crystal epitaxial ferroelectric thin film and without giving damages to a substrate composed of the same kind of oxide as the thin film optical waveguide. Therefore, manufacture of a mode index lens in the optical waveguide of epitaxial ferroelectric thin film is not reported so far.

The Luneburg lens is a soft of the mode index system (2) in which a circular high refractive index film having gradually varying thickness is disposed on a waveguide. In principle, it has a feature capable of forming a non-aberration lens, but it is not industrially suitable since the shape with gradually varying film thickness cannot be manufactured easily at a good reproducibility.

The Geodesic lens is of a system in which a cup-shaped concave portion is formed to a substrate, on which a waveguide is disposed and this is only one system capable of focusing images with no aberration also to multi-mode propagation light. However, it is difficult to machine the concave portion at high accuracy and good productivity on the substrate and this is not industrially suitable, either.

Both of the Fresnel lens and the Grating lens are of a system utilizing diffraction, but they are identical with the mode index lens in that regions having an effective refractive index which is different stepwise are formed in the waveguide. They have a feature capable of being formed by a planar process and a feature in that the optical system is compact. On the other hand, since the pattern is fine, it has to be manufactured by electron bean (EB) lithography which is poor in the product at present. In addition, it may result in straight forward light in addition to condensed light to cause cross-talk, and characteristics are sometimes changed greatly depending on the change of the incident angle or incident wavelength.

As described above, while various waveguide lens systems and manufacturing methods thereof are known, there are no waveguide lens system having satisfactory characteristics as the lens and good productivity and applicable to optical waveguides of epitaxial ferroelectric thin film, as well as manufacturing methods thereof, leaving a problem of incapable of forming waveguide lens to optical waveguides of ferroelectric thin film having high characteristics thereby attaining highly functional optical integrated devices.

OBJECT OF THE INVENTION

It is an object of the present invention to provide an optical waveguide device in which a waveguide lens having satisfactory characteristics is disposed to an optical waveguide of an epitaxial ferroelectric thin film having high characteristic.

It is another object of the invention to provide a method of manufacturing an optical waveguide device in which a waveguide lens having satisfactory characteristic and productivity is disposed to an optical waveguide of an epitaxial ferroelectric thin film having high characteristics.

A further object of the present invention is to provide an optical waveguide which can be utilized to various kinds of deflection devices, switching devices or modulation devices.

SUMMARY OF THE INVENTION

The foregoing objects of the present invention can be attained by an optical waveguide device comprising:

a first epitaxial or uni-orientation ferroelectric thin film disposed on a surface of a single crystal substrate and formed into a lens shape to constitute a lens portion and a second epitaxial or uni-orientation ferroelectric thin film disposed on the single crystal substrate to constitute an optical waveguide portion and comprising a material or a composition different from that of the first ferroelectric thin film in which an optical beam incident to the optical waveguide portion is controlled by utilizing the difference of effective refractive index between the lens portion and the optical waveguide portion.

In this text, the term "uni-orientation" means that the strength of a crystal face in parallel to the surface of the substrate in an X-ray diffraction pattern of a thin film is 1% or less relative to the strength of other crystal face, and "epitaxial" means that the "uni-orientation" thin film further has uni-orientation also in a direction within a plane of the substrate.

Another object of the invention can be attained by a method of manufacturing an optical waveguide device which comprises the steps of;

forming an amorphous thin film of a ferroelectric material on a surface of a single crystal substrate;

patterning the amorphous thin film into a lens shape;

forming the amorphous thin film into a first epitaxial or uni-onrientation ferroelectric thin film to constitute a lens portion by solid phase epitaxy; and forming a second epitaxial or uni-orientation ferroelectric thin film to constitute an optical waveguide portion on the single crystal substrate.

A further object of the invention can be attained by a method of manufacturing an optical waveguide device which comprises the steps of:

forming an amorphous thin film of a ferroelectric material on a surface of a single crystal substrate;

patterning a window of a lens shape to the amorphous thin film;

forming the amorphous thin film into a second epitaxial or uni-orientation ferroelectric thin film to constitute an optical waveguide portion by solid phase epitaxy; and forming a first epitaxial or uni-orientation ferroelectric thin film to constitute a lens portion on the single crystal substrate.

In the present invention, materials usable for the single crystal substrate can include, for example, oxides such as $SrTiO_3$, Nb doped $SrTiO_3$, La doped $SrTiO_3$, $BaTiO_3$, $BaZrO_3$, $LaAlO_3$, $ZrO_2$, $Y_2O_3 8\%\text{-}ZrO_2$, $MgO$, $MgAl_2O_4$, $LiNbO_3$, $LiTaO_3$, $Al_2O_3$, $ZnO$, Al doped $ZnO$, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $CdGa_2O_4$, $Mg_2TiO_4$, $MgTi_2O_4$, elemental semiconductors such as of, Si, Ge and diamond, III–V series compound semiconductors such as AlAs, AlSb, AlP, GaAs, GaSb, InP, InAs, InSb, AlGaP, AlLnP, AlGaAs, AlInAs, AlAsSb, GaInAs, GaInSb, GaAsSb and InAsSb, and II–VI series compound semiconductors such as ZnS, ZnSe, ZnTe, CaSe, CdTe, HgSe, HgTe and CdS. Use of oxides is often advantageous for the film quality of an optical waveguide of a thin oxide film to be disposed to an upper portion.

The materials for the optical waveguide constituted with the first and the second ferroelectric thin films are selected from oxides. Specifical ly, they can be selected, from ferroelectrics typically represented, for example, by $BaTiO_3$, $PbTiO_3$, $Pb_{1-x}La_x(Zr_yTo_{1-y})_{1-x/4}O_3$ (0<x<30, 0<y<100; PZT, PLT, PLZT depending on the values of x and y), $Pb(Mg_{1/3}Nb_{2/3})O_3$ and $KNbO_3$ for tetragonal system, orthorhombic system or pseudo cubic system, and $LiNbO_3$ and $LiTaO_3$ for hexagonal system, in $ABO_3$ perovskite type, and $Sr_xBa_{1-x}Nb_2O_6$, $Pb_xBa_{1-x}Nb_2O_6$ in tungsten bronze type and, in addition, $Bi_4Ti_3O_{12}$, $Pb_2KNb_5O_{15}$, $K_3Li_2Nb_5O_{15}$, as well as substituted derivatives of them.

Since the thin film optical waveguides have the epitaxial or uni-orientation relation to the single crystal substrate, it is desirable that the material for the thin film optical waveguide has a crystal structure similar to the material for the single crystal substrate and have a difference of the lattice constant of 10% or less. However, this relation is not always necessary providing that the epitaxial relation can be maintained between them. Further, it is necessary for the material of the thin film optical waveguide that it has a refractive index greater than that of the single crystal substrate in order to confine light in the thin film optical waveguide layer. The thickness of the ferroelectric thin film is usually set within a range from 0.1 μm to 10 μm, and this can be selected properly depending on the purpose.

When a conductive or semiconductive substrate is used, an upper electrode is disposed on the surface of the optical waveguide and a voltage is applied to the optical waveguide, it is desirable to dispose a transparent oxide buffer layer at high dielectric constant for increasing the effective voltage applicable to the optical waveguide and reducing the optical propagation loss caused by the substrate. In this case, a material is selected such that it has a refractive index smaller than that of the first and the second ferroelectric thin films, the ratio of the specific dielectric constant between the buffer layer and the specific dielectric constant of the optical waveguide is 0.002 or more, desirably, the ratio between the specific dielectric constant of the buffer layer and the specific dielectric constant of the waveguide is 0.006 or more, and the material having the specific dielectric constant of the buffer layer of 8 or more is selected. Further, it is necessary for the buffer layer material that the epitaxial relation can be maintained between the material for the conductive substrate and the material for the optical waveguide. For the condition capable of maintaining the epitaxial relationship, it is desirable that the buffer layer material has a crystal structure similar to that of the conductive substrate material and the optical waveguide material and has a difference of the lattice constant of 10% or less. However, this relationship is not always necessary providing that the epitaxial relationship can be maintained between them.

Specifically, the material is selected from ferroelectrics typically represented, for example, by $SrTiO_3$, $BaTiO_3$, $(Sr_{1-s}Ba_x)TiO_3$ (0<x<1), $PbTiO_3$, $Pb_{1-x}La_x(Zr_yTo_{1-y})_{1-x/4}O_3$ (0<x<0.3, 0<y<1.0; PZT, PLT, PLZT, depending on the values of x and y), $Pb(Mg_{1/3}Nb_{2/3})O_3$ and $KNbO_3$ for tetragonal system, rhombohedral system, orthorhombic system or pseudo cubic system, and $LiNbO_3$ and $LiTaO_3$ for hexagonal system, in $ABO_3$ perovskite type, and $Sr_xBa_{1-x}Nb_2O_6$, $Pb_xBa_{1-x}Nb_2O_6$ in tungsten bronze type and, in addition, $Bi_4Ti_3O_{12}$, $Pb_2KNb_5O_{15}$, $K_3Li_2Nb_5O_{15}$, as well as substituted derivatives of them. The ratio of the film thickness between the buffer layer and the optical waveguide is 0.1 or more, preferably, 0.5 or more and the thickness of the buffer layer is advantageously 10 nm or more.

The lens system can be selected from the mode index system, Fresnel system and grating system, for which the planar process is available. In view of the condensing efficiency, the mode index system is desirable. In the mode index system, the shape of the lens, as viewed from the upper surface of the thin film optical waveguide, is selected from a circular or pupil type convex lens when the effective refractive index of the lens portion is made greater than that of the thin film optical waveguide and from a concave lens when the effective refractive index of the lens portion is made smaller than that of the thin film optical waveguide portion depending on the lens shape. Generally, a circular or pupil type convex lens is often required for the optical waveguide device.

In a case of increasing the effective refractive index of the lens portion to greater than that of the thin film optical waveguide portion and applying the circular or pupil type convex lens of the mode index system, Fresnel system or grating system, it is necessary that the first ferroelectric thin film constituting the lens portion is disposed between the substrate and the second ferroelectric thin film and has the refractive index greater than that of the second ferroelectric thin film constituting the optical waveguide portion. Further, it is desirable that the first ferroelectric thin film has a thickness smaller than that of the second ferroelectric thin film, and has a thickness larger than that of a cut-off film for optical waveguide to the first ferroelectric thin film.

In a case of making the effective refractive index of the lens portion to smaller than that of the thin film optical waveguide and applying a concave lens of the mode index system or Fresnel system, it is necessary that the first ferroelectric thin film constituting the lens portion has a refractive index smaller than that of the second ferroelectric thin film constituting the optical waveguide portion, and the second ferroelectric thin film constituting the optical waveguide portion is disposed between the substrate and the first ferroelectric thin film. Further, it is desirable that the second ferroelectric thin film has a thickness smaller than that of the first ferroelectic thin film and has a thickness larger than that of the cut-off film for optical waveguide to the second ferroelectric thin film.

In the process for manufacturing the optical waveguide device of the present invention, in a case of increasing the effective index of the lens portion to greater than that of the thin film optical waveguide portion and applying a circular or pupil type convex lens of the mode index system, Fresnel system or grating system, it is manufactured by a method of at first forming an amorphous ferroelectric thin film on the surface of a single crystal substrate using a process selected from a vapor phase process such as electron beam deposition, flash deposition, ion plating, Rf-magnetron sputtering, ion beam sputtering, laser abrasion, MBE, CVD, plasma CVD and MOCVD, and a wet process such as sol-gel method or an MOD method.

Subsequently, the amorphous thin film is patterned to a lens shape by a method of coating a photo-resist or an electron beam resist on the surface of the amorphous thin film and then applying exposure and etching. For the etching, it is effective to employ wet etching using an aqueous solution of HCl, $HNO_3$, HF, $H_2SO_4$, $H_3PO_4$, $C_2H_2O_2$ or $NH_4F$ or an aqueous mixed solution thereof, reactive ion etching using, for example, $CCl_4$, $CCl_2F_2$ or $CHClCF_3$ or a gas mixture of them with $O_2$, or dry etching using, for example, ion beam etching, etching being applicable easily by wet etching.

Subsequently, an epitaxial or uni-orientation first ferroelectric thin film of a lens shape is obtained through solid phase epitaxy by heating the single crystal substrate having the amorphous ferroelectrics thin film. Further, for constituting the optical waveguide, an epitaxial or unit-orientation second ferroelectric thin film is grown on the surface of the single crystal substrate and the first ferroelectric thin film by an epitaxial growing method selected from a vapor phase epitaxial growing method such as electron beam deposition, flash deposition, ion plating, Rf-megnetron sputtering, ion beam sputtering, laser abrasion, MBE, CVD, plasma CVD and MOCVD, and a sold phase epitaxial growing method by a wet process such as a sol-gel method and a MOD method.

Also, the first and the second ferroelectric thin films may be crystallized into the epitaxial or uni-orientation state by solid phase epitaxy of simultaneously heating them after forming an amorphous thin film to form the epitaxial or uni-orientation second ferroelectric thin film by any of the methods described above on the surface of the lens shape amorphous thin film to form the first epitaxial or uni-orientation ferroelectric thin film and the single crystal substrate.

In the case of using the buffer layer, the buffer layer is epitaxially grown on the surface of the single crystal substrate by any of the methods described above before forming the ferroelectric amorphous thin film on the surface of the single crystal substrate.

In a process for manufacturing an optical waveguide device according to the present invention by decreasing the effective refractive index of the lens portion to smaller than that of the thin film optical waveguide portion and applying a concave lens of the mode index system or Fresnel system, an amorphous ferroelectric thin film is at first prepared on the surface of a single crystal substrate by a method selected from the film-forming forming processes described above. Then, a lens-shaped window is patterned to the amorphous thin film by a method of coating a photo-resist or an electron beam resist on the surface of the amorphous thin film and then applying exposure and etching. Subsequently, the single crystal substrate having the amorphous ferroelectric thin film is heated to obtain an epitaxial or uni-orientation second ferroelectric thin film constituting an optical waveguide by solid phase epitaxy.

Then, an epitaxial or uni-orientation first ferroelectric thin film constituting a lens portion is grown on the surface of the single crystal substrate and the second ferroelectric thin film by the method selected from the film-forming processes described above. Alternatively, after forming an amorphous thin film to form an epitaxial or uni-orientation first ferroelectric thin film by any of the methods described above on the surface of an amorphous thin film having a lens-shaped window to form an epitaxial or uni-orientation second ferroelectric thin film and a single crystal substrate, the first and the second ferroelectric thin films may be crystallized into the epitaxial or uni-orientation state by solid phase epitaxy of simultaneously heating them.

In the case of using a buffer layer, the buffer layer is epitaxially grown on the surface of the single crystal substrate by any of the methods described above before forming the amorphous ferroelectric thin film on the surface of the single crystal substrate.

DESCRIPTION OF THE ACCOMPANYING DRAWINGS

Figure 9A:
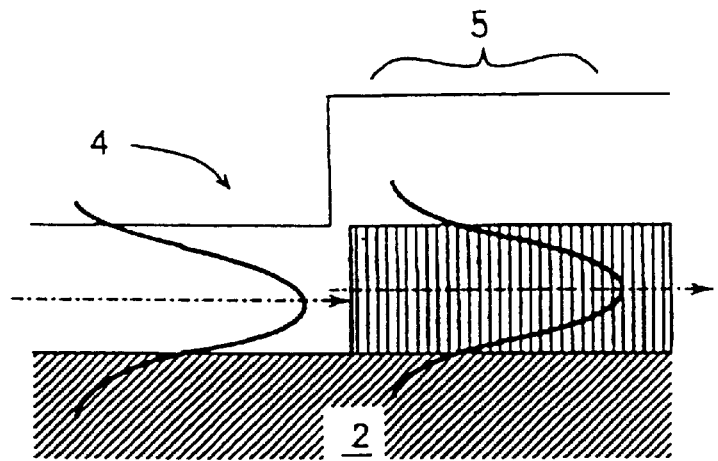
Figure 9B:
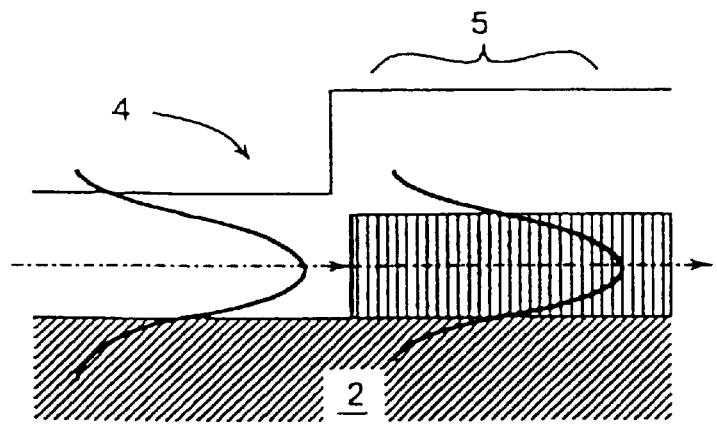
Figure 9C:
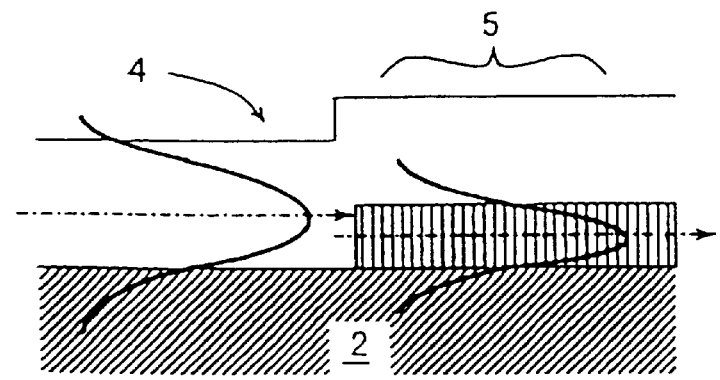
Figure 10:
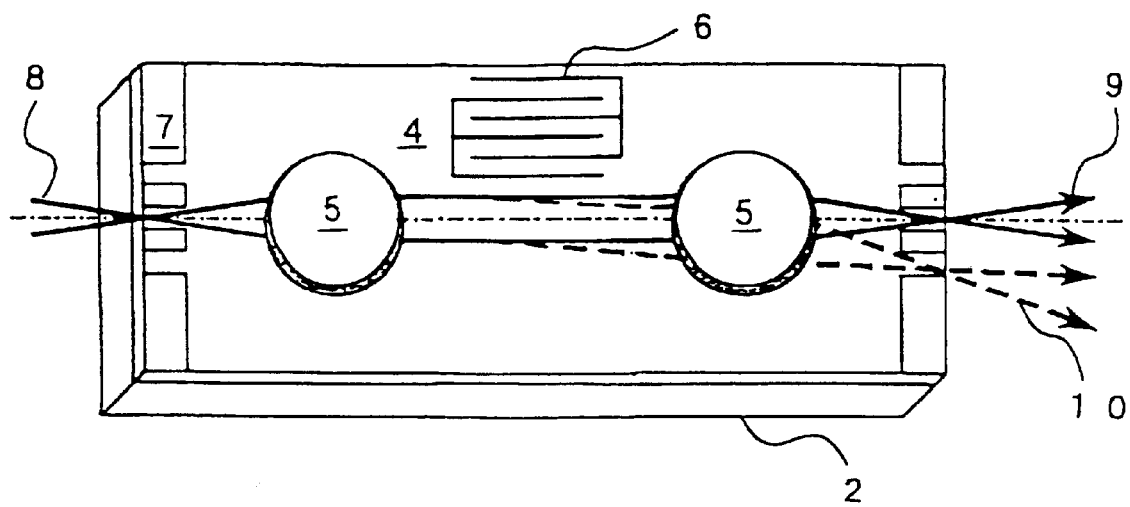
Figure 11:
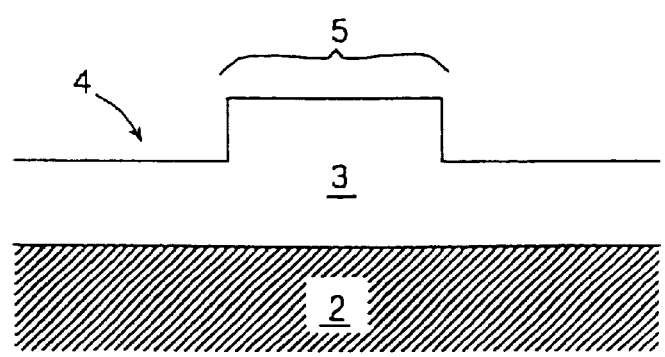
Figure 12:
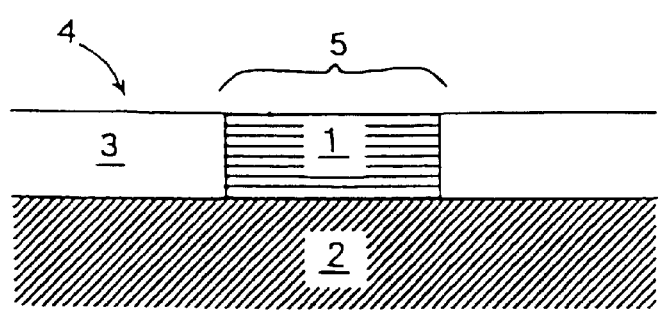
Figure 13:
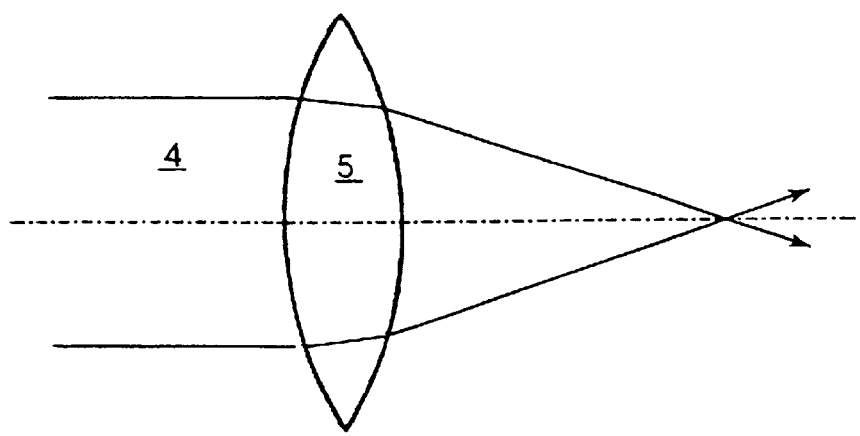
Figure 14:
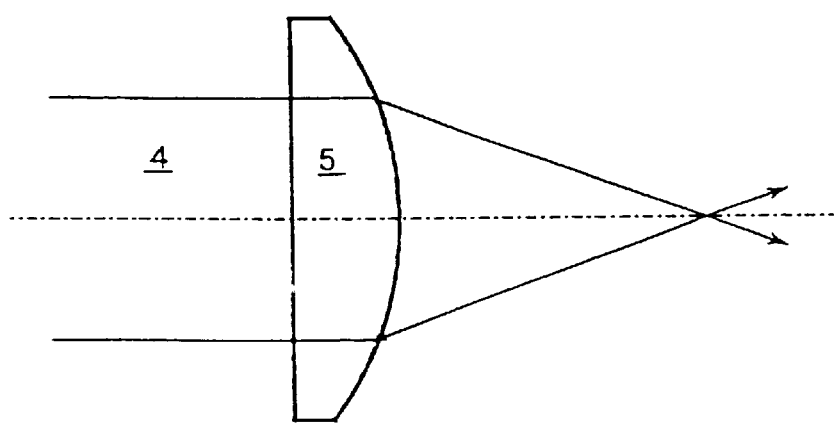
Figure 15:
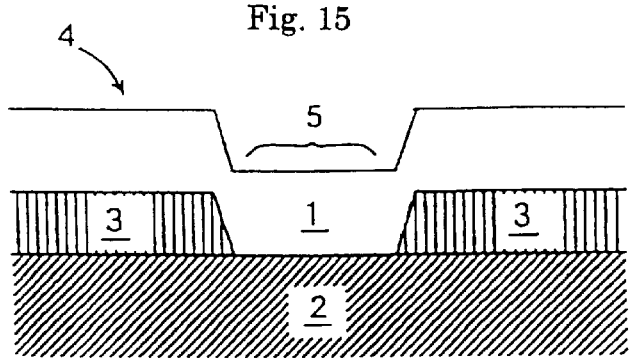
Figure 16:
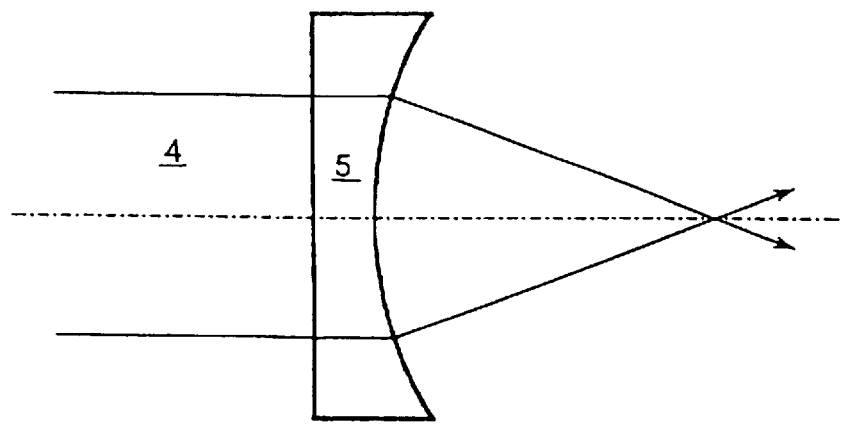
Figure 17:
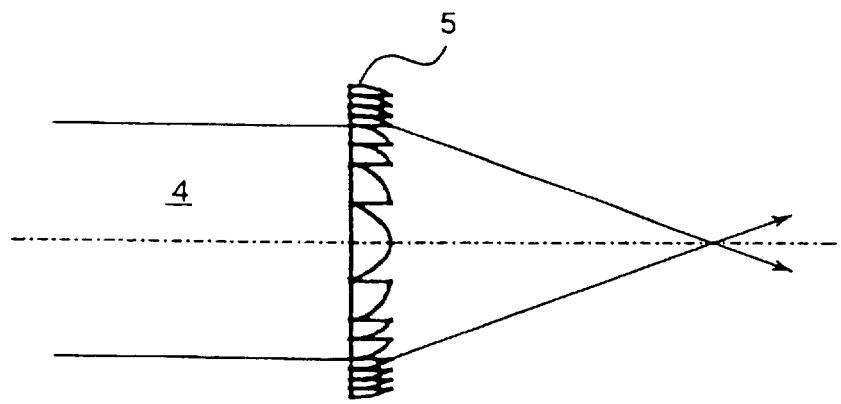
Figure 18:
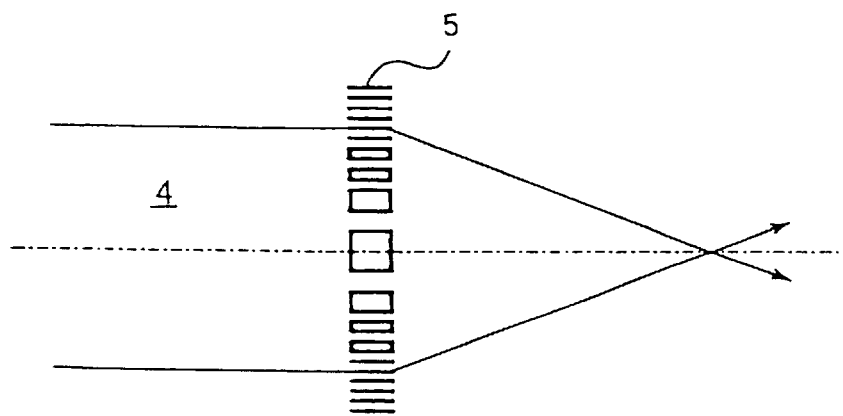
Figure 19:
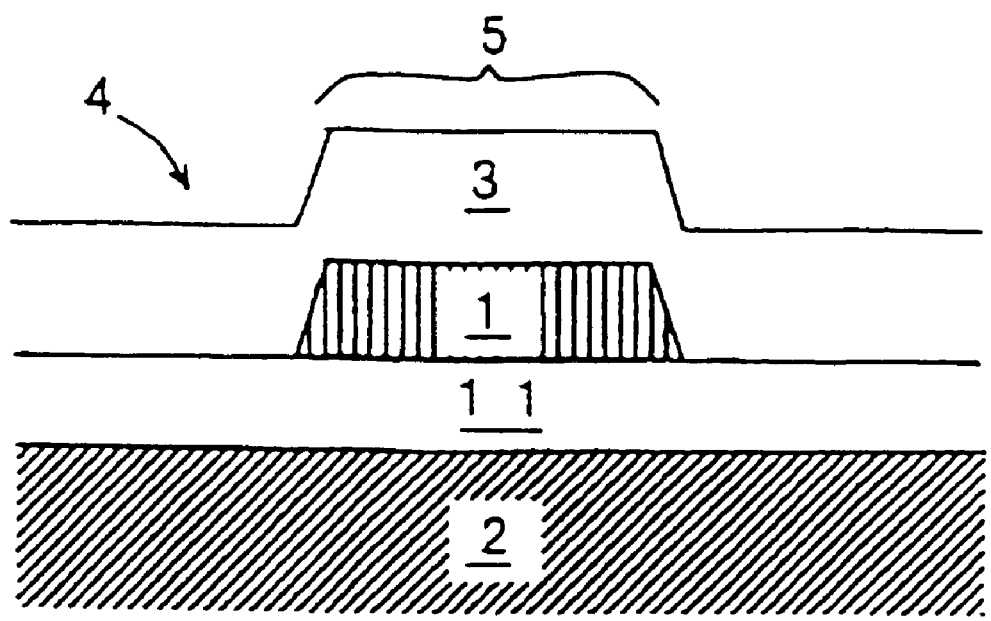

FIGS. 9(a)–9(c) is a view illustrating a change of the electric field distribution in a case where the thickness of the first thin film is changed relative to that of the second thin film;

FIG. 10 is a perspective view of an optical waveguide device of Example 1 in accordance with the embodiment of the present invention;

FIG. 11 is a cross sectional view illustrating a structure of an optical waveguide device of Comparative Example 1;

FIG. 12 is a cross sectional view illustrating a structure of an optical waveguide device of Comparative Example 2;

FIG. 13 is an upper plan view of an optical waveguide device of Example 2 in accordance with an embodiment of the present invention;

FIG. 14 is an upper plan view of an optical waveguide device of Example 3 in accordance with the embodiment of the present invention;

FIG. 15 is a cross sectional view of an optical waveguide device of Example 6 in accordance with the embodiment of the present invention;

FIG. 16 is an upper plan view of an optical waveguide device of Example 6 in accordance with the embodiment of the present invention;

FIG. 17 is an upper plan view of an optical waveguide device of Example 7 in accordance with the embodiment of the present invention;

FIG. 18 is an upper plan view of an optic waveguide device of Example 8 in accordance with the embodiment of the present invention; and FIG. 19 is an upper plan view of an optical waveguide device of Example 9 in accordance with the embodiment of the present invention.

PREFERRED EMBODIMENT OF THE INVENTION

An optical waveguide device according to a preferred embodiment of the present invention will be explained with reference to FIG. 1 to FIG. 18. At first, explanations will be made in detail about a circular convex lens of a mode index system in which the effective refractive index of a lens portion is made greater than of a thin film optical waveguide portion in the present invention. Other thin film lenses included in the present invention are substantially identical in view of the principle.

Figure 1:
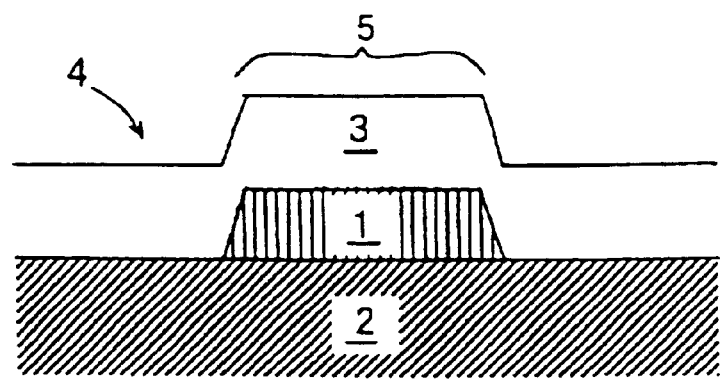
FIG. 1 is a cross sectional view illustrating a structure of an optical waveguide device in Example 1 according to an embodiment of the present invention.

The waveguide lens is formed by disposing a first ferroelectric thin film 1 having a high refractive index layer between a substrate 2 and a second ferroelectric thin film 3 as a waveguide as shown in FIG. 1 to form relative difference in the refractive index.

In this case, a synthetic focal distance f of two lenses having a distance t between convex faces each having a radius of curvature of $r_1$, $r_2$ (circular lens $r=r_1=-r_2$ shown in FIG. 2) is given by the following equation based on the paraxial formula:

$$f = \delta \cdot r_1 \cdot r_2 / \delta \quad [1]$$

$$\delta = (\rho-1) \cdot \{\rho \cdot (r1-r2) - (\rho-1) \cdot t\} \quad [2]$$

$$\rho = N_L / N_G \quad [3]$$

in which $N_L$ and $N_G$ represent effective refractive indexes for the lens portion and the waveguide portion, respectively.

In the circular lens, since:

$$r = r_1 = -r_2 \quad [4]$$

$$t = 2r \quad [6]$$

and therefore the focal distance f is given as:

$$f = \rho \cdot r / \{2(\rho-1)\} \quad [6]$$

Accordingly, assuming the diameter D for the incident pupil as r which corresponds to ½ of the lens diameter, the F value for the lens is given as:

$$F \text{ value} = f/D = \rho/\{2(\rho-1)\} \quad [7]$$

Figure 3:
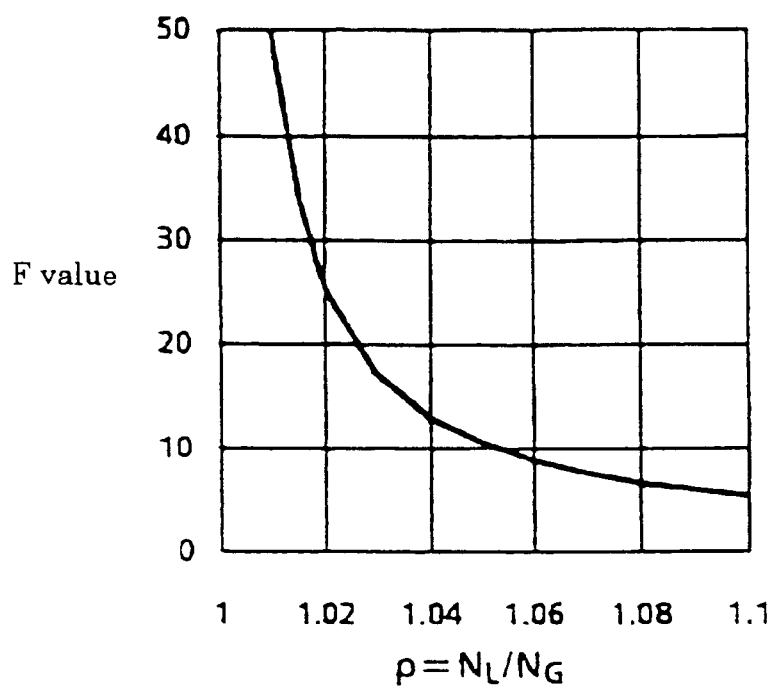
FIG. 3 is a graph illustrating a relationship of an effective refractive index ratio between a first thin film and a second thin film to an F value of a lens in the embodiment of the present invention.

FIG. 3 illustrates a relationship between the F value and the refractive index ratio ρ and it is necessary that ρ is 1.05 in order to make the F value about 10 for making the optical waveguide device compact.

For instance, considering a thin film of $Pb_{1-x}La_x(Zr_yTi_{1-y})_{1-x/4}O_3$, since the refractive index varies within a range about from 2.45 to 2.70 depending on the composition, the constitution of this embodiment can be obtained by use of a layer of a first composition (first ferroelectric thin film) 1 of a large refractive index and a layer of second composition (second ferroelectric thin film) 3 of a small refractive index for the lens portion 5 and disposing only the second composition layer 3 of a refractive index smaller than that of the lens portion for the waveguide portion 4. Generally, since the effective refractive index is smaller than the refractive index, if the effective refractive index of the lens portion is set to 2.65 and the effective refractive index of the waveguide portion is set to 2.40, the refractive index ratio ρ is 1.104 and the F value of 5.3 is obtained for the circular lens according to the equation [7].

The effective refractive index can be measured actually, as well as theoretically calculated as follows.

Figure 4:
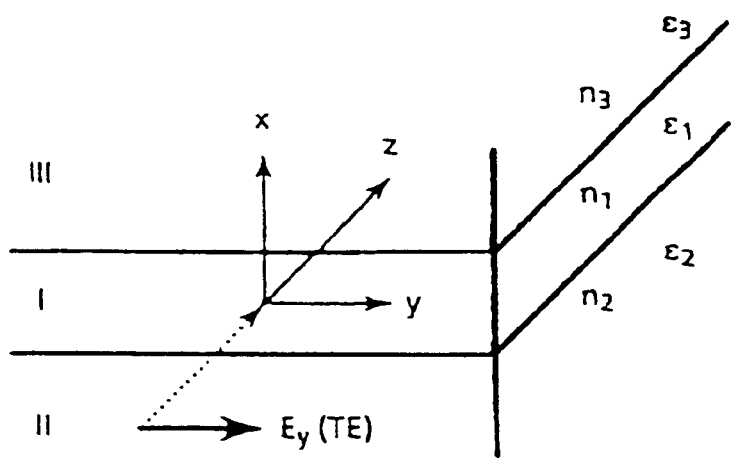
FIG. 4 is a view illustrating a principle of an electromagnetic field distribution in an optical waveguide.
Figure 5:
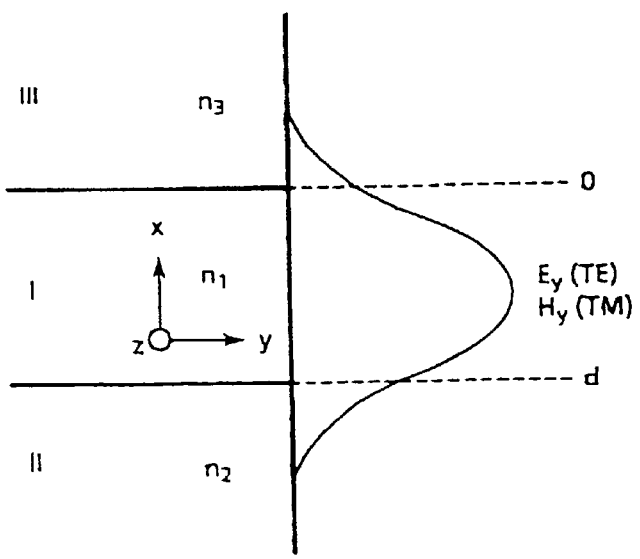
FIG. 5 is a view illustrating a principle of an electromagnetic field distribution in an optical waveguide.

In a slab type optical waveguide as shown in FIG. 4 and FIG. 5, a wave equation of optical waves propagating at exp j[ωt−βz] in a direction z is given as below.

$$\delta^2(E_z, H_z)/\delta x^2 + \delta^2(E_z, H_z)/\delta y^2 + x_i^2(E_z, H_z)/\delta z^2 = 0 \quad [8]$$

$$(\chi_i^2 = k_i^2 - \beta^2, \ k_i^2 = \omega^2 \mu_o \epsilon_i k_o^2 n_i^2, \ i=1,2,4)$$

in which ω is an angular frequency of optical waves, $\mu_o$ is a permeability in vacuum, and β is a propagation constant. Assuming the electromagnetic field being uniform in the direction y, the equation can provide the following wave equation by saving exp j[ωt−βz] and putting $E_z, H_z \ F(x)$:

$$d^2 F(x)/dy^2 + \chi_d F(x) = 0 \quad [9]$$

Accordingly, all the electromagnetic field components are represented by an exponential function or triangular function, an electromagnetic field uniform in one direction is represented as a TE mode ($E_z=0$) and a TM mode ($H_z=0$), and the electromagnetic field components are given as below.

TE: $E_z=0, E_x=H_y=0$ $$\delta E_y/\delta_z = j\overline{\omega}\mu_o H_x$$

$$\delta E_y/\delta_x = -j\overline{\omega}\mu_o H_z$$

TE: $H_z=0, H_x=E_y=0$ $$\delta H_y/\delta_z = -j\overline{\omega}\epsilon_i E_x$$

$$\delta H_y/\delta_x = -j\overline{\omega}\epsilon_i E_z$$

Now, for the TE mode, since the electromagnetic fields in the regions II and III should be zero at $|x|=\infty$, assuming d as the thickness of the region I which is the waveguide layer, $$III: E_{y3} = E_3 \exp(-\gamma_3 x), \ x > 0 \quad [10]$$

$$I: E_{y1} = E_1 \cos(k_x x + \phi_3), \ -d < x < 0 \quad [11]$$

$$II: E_{y2} = E_2 \exp\{\gamma_2(x+t)\}, \ x < -d \quad [12]$$

Assuming $n_1$ as a refractive index in the region I, $n_2$ as a refractive index in the region II, $n_3$ as a refractive index in the region III and N as an effective refractive index in the region I, $$\gamma_3 = k_o(N^2 - n_3^2)^{0.5} \quad [13]$$

$$k_x = k_o(n_1^2 - N^2)^{0.5} \quad [14]$$

$$\gamma_2 = k_o(N^2 - n_2^2)^{0.5} \quad [15]$$

Based on the boundary condition that electric field components $E_y$ and $H_z$ are continuous at x=0, $$E_3 = E_1 \cos \phi_3 \quad [16]$$

$$\tan \phi_3 = \gamma_3/k_x \quad [17]$$

In the same manner, $$E_2 = E_1 \cos(k_x d - \phi_3) \quad [18]$$

$$\tan(k_x t - \phi_3) = \gamma_2/k_x \quad [19]$$

With the relationships described above, $$k_x d = (m+1)\pi - \tan^{-1}(k_x/\gamma_2) - \tan^{-1}(k_x/\gamma_3) \quad [20]$$

in which m is a mode number (m=0, 1, 2, . . . ).

Based on the relationship shown by the equation [20], the refractive index ratio N to the TE mode can be determined by giving the refractive index in each of the regions and the thickness of the waveguide layer. Further, in addition to the determination for the effective refractive index and the electromagnetic field distribution by the analyzing method described above, the effective refractive index and the electromagnetic field distribution in the waveguide of the laminate structure can also be determined by BPM (Beam Propagation Method).

TABLE 1

| | Designed value (wavelength: 633 nm) | |
|---|---|---|
| Structure | Waveguide | Lens |
| Second layer | 600 nm-PLZT (n = 2.49) | 600 nm-PLZT (n = 2.49) |
| First layer | — | 500 nm-PZT (n = 2.61) |

TABLE 1-continued

Designed value (wavelength: 633 nm)

| Structure | Waveguide | Lens |
|---|---|---|
| Substrate | SrTiO$_3$ (n = 2.40) | SrTiO$_3$ (n = 2.40) |
| TE$_0$ cut-off film thickness | 190 | 90 |
| TE$_1$ cut-off film thickness | 670 | 500 |
| Mode | Single | Single |
| Effective refractive index | 2.4589 | 2.5744 |

When the effective refractive index at a wavelength of 633 nm is determined by BPM for the structure shown in FIG. 1 comprising a waveguide portion of air (n=1)/PLZT(9/65/35) thin film (n=2.49)/SrTiO$_3$ substrate (n=2.40), and a lens portion of air (n=1)/PLZT(9/65/35) thin film (n=2.49)/PZT (30/70) thin film (n=2.61)/SrTiO$_3$ substrate (n=2.40), since the effective refractive index is 2.4589 for the waveguide portion, 2.5744 for the lens portion and the effective refractive index ratio is 1.0470, the F value of 11.1 is obtained according to the equation [7].

The F value in this embodiment can be set as described above. It is also important to have a structure capable of reducing as much lowering of the coupling efficiency as possible by the change of the electromagnetic field distribution in the lens portion and the waveguide portion. The coupling efficiency is in proportion with an overlap integral for the electromagnetic field distribution for the lens portion and the waveguide portion and is expressed in the TE mode by the following equation.

$$\eta = (\int_{-\infty}^{+\infty} E_{yG} \cdot E_{yL} dx)^2 \div \{\int_{-\infty}^{+\infty} |E_{yG}|^2 dx \times \int_{-\infty}^{+\infty} |E_{yL}|^2 dx\} \quad [21]$$

in which $E_{yG}$ is an electric field amplitude in the waveguide portion and $E_{yL}$ is an electric field amplitude in the lens portion. The coupling loss tends to be increased, in principle, in the method (1) of utilizing the difference of the fin thickness, the method (2) of disposing a high refractive index layer and the method (3) of burying the high refractive index layer in the prior art, because the electromagnetic field distribution is offset due to a step present between the lens portion and the waveguide portion which lowers the overlap integral On the contrary, as a result of earnest study on the overlap integral for various types of structures, the present inventors have found that a satisfactory coupling efficiency can be obtained even by the above mentioned method, which was considered to result in a large coupling loss in principle, in a structure having high productivity of covering a thin film lens of a high refractive index with a thin film optical waveguide of a low refractive index as shown in FIG. 1. This coupling efficiency is comparable with that by the method (4) of applying diffusion or ion exchange of other element to a waveguide which is difficult to fabricate or the method (5) of patterning a portion of the waveguide and then refilling the same with other materials.

For example, when an electric field distribution is calculated for a structure of covering a thin film lens of a high refractive index with a tin film optical waveguide of a low refractive index shown in Table 1, it has been found that electric field distributions substantially overlap between the waveguide portion and the lens portion and, as a result of overlap integral of equation [21], the coupling efficiency at the boundary between the waveguide portion and the lens portion is 96.5%, the coupling efficiency for the sum of the incident coupling to the lens portion and the emitting coupling from the lens portion is 93.1%, or the coupling loss is 0.31 dB.

Figure 6:
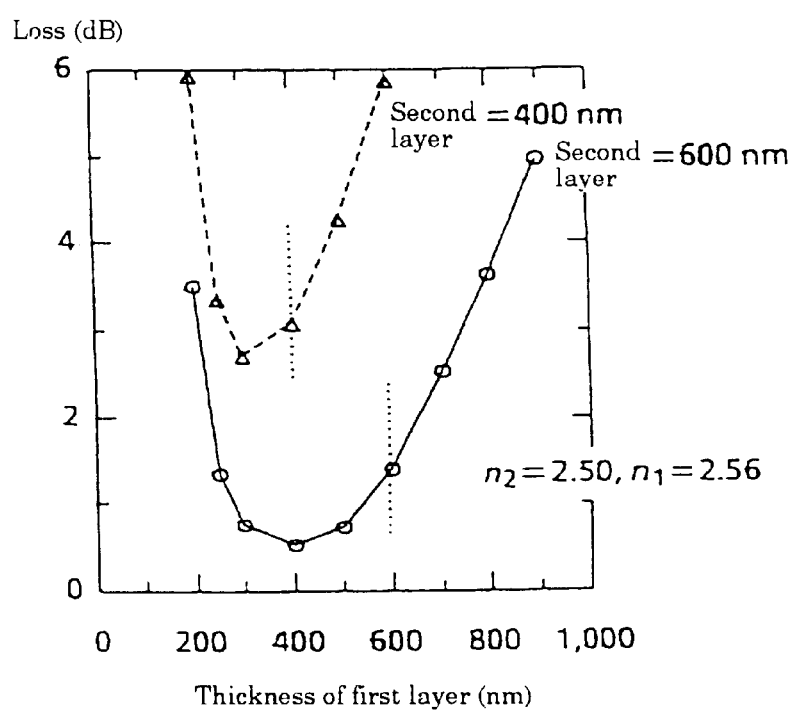
FIG. 6 is a graph illustrating a relationship between the thickness of the first thin film and the second thin film and a coupling loss in the structure of the first thin film with a refractive index of 2.56 and the second thin film with a refractive index of 2.50 on a substrate with a restive index of 2.40.
Figure 7:
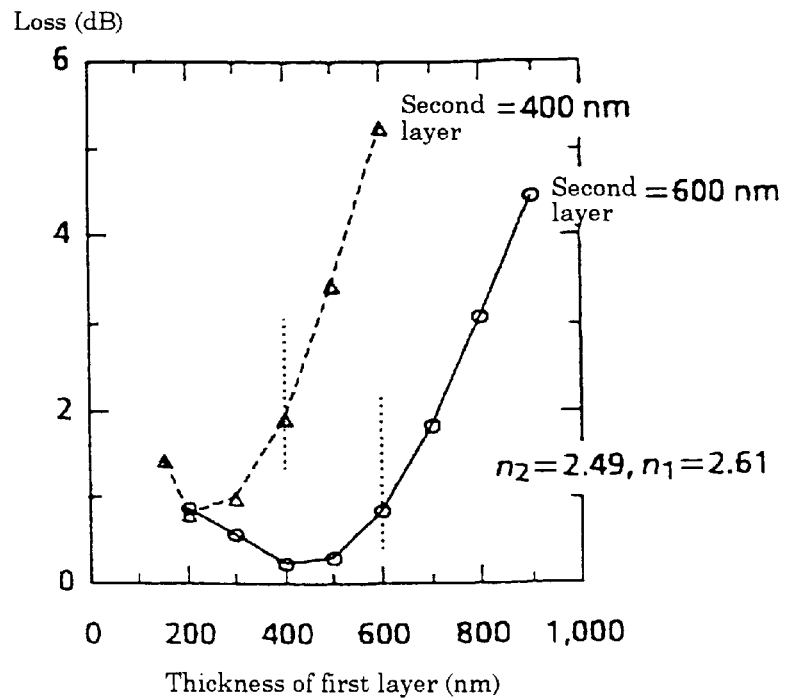
FIG. 7 is a graph illustrating a relationship between the thickness of the first thin film and the second thin film and a coupling loss in the structure of the first thin film with a refractive index of 2.61 and a second thin film with a refractive index of 2.49 on a substrate with a refractive index of 2.40.
Figure 8:
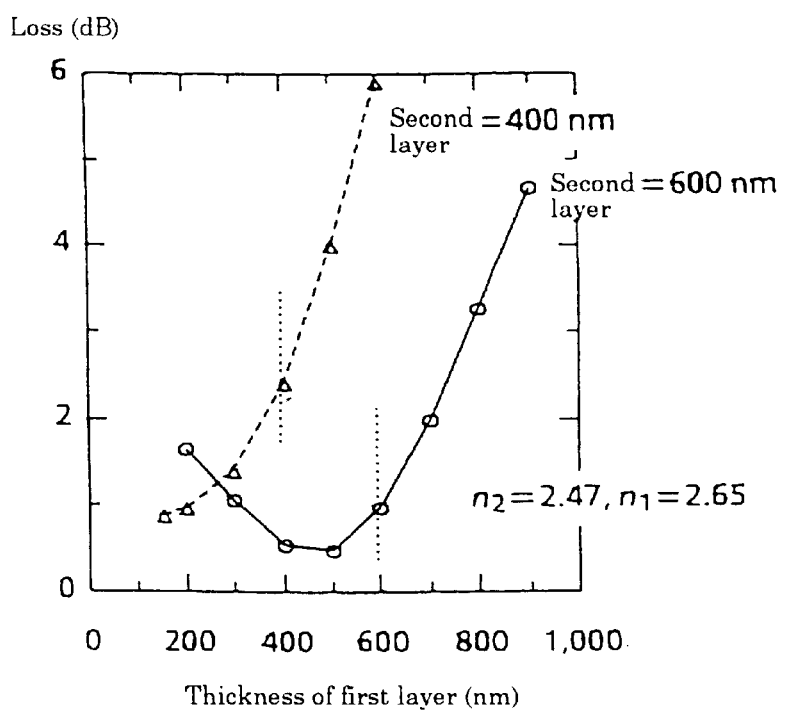
FIG. 8 is a graph illustrating a relationship between the thickness of the first thin film and the second thin film and a coupling loss in the structure of the first thin film with a refractive index of 2.65 and a second thin film with a refractive index of 2.47 on a substrate with a refractive index of 2.40.

FIG. 6 to FIG. 8 show the result of calculation for the relationship between the thickness of the first thin film 1 and the coupling loss at the thickness of the second thin film of 400 nm and 600 nm, each in a case for the first thin film refractive index 2.56/second thin film refractive index 2.50 (FIG. 6), first thin film refractive index 2.61/second thin film refractive index 2.49 (FIG. 7) and the first thin film refractive index 2.65/second thin film refractive index 2.47 (FIG. 8), respectively. It can be seen in each of the cases that the minimum value of the coupling loss is present in a region where the thickness of the first thin film is less than that of the second thin film. This is attributable to that the distribution of the electromagnetic field is asymmetric and the center is deviated toward the substrate in the thin film optical guide portion since the refractive index difference is large between air or a clad layer above and the substrate below, whereas the distribution of the electromagnetic field is substantially symmetrical in the lens portion since the upper portion comprises the material of the thin film optical waveguide, so that the refractive index difference between the upper portion and the lower portion is small.

Accordingly, even in a structure causing an apparent difference in the film thickness, it is considered, as shown in FIGS. 9(a)–(c) that overlap of the electromagnetic field distribution is increased as the thickness of the first thin film having high refractive index to form the lens portion is decreased to less than the thickness of the second thin film having low refractive index to form the thin film optical waveguide portion, since the distribution of the electromagnetic field in the lens portion is shifted toward the substrate and the overlap of the electromagnetic field distribution is decreased as the thickness of the thin film is further decreased, since the electromagnetic field distribution in the lens portion is shifted excessively toward the substrate. The lower limit for the thickness of the first thin film is the thickness of a cut-off film for optical waveguide to the fast thin film since the light has to be guided to the first thin film.

Further, in the structure described above, both of the waveguide portion and the lens portion can be kept to a single mode, and there is no problem caused by the mode conversion. Since the thickness of the PLZT thin film in the waveguide portion is 600 nm which is less than 670 nm of the cut-off film thickness in the TE$_1$ mode, this is in the TE$_0$ single mode. On the other hand, the thickness of the PZT thin film in the lens portion is 500 nm and since this is more than 420 nm for the cut-off film thickness in the TE$_1$ mode if the upper portion comprises air, it results in a multi-mode of TE$_0$ and TE$_2$. However, since the PLZT thin film of 600 nm in thickness is covered, the thickness of the TE$_1$ mode cut-off film is 500 nm and the TE$_0$ single mode can be obtained.

As a process for manufacturing the thin film lens described above, it has been found as a result of the study on solid phase epitaxial growing that it is effective to at first prepare an amorphous ferroelectric thin film on the surface of the single crystal substrate and then pattern the amorphous thin film into a lens shape by etching. This is considered to be attributable to that the amorphous thin film is free from crystal grains and homogeneous and its etching rate is much faster than that for crystals, so that selective etching is facilitated without giving surface roughness that would cause scattering loss in the optical waveguide of epitaxial ferroelectric thin film and without giving damages to the substrate comprising an oxide identical with that for the optical waveguide. Particularly, when an epitaxial buffer layer is disposed on the surface of the single crystal substrate, since the epitaxial oxide buffer layer is sometimes not completely crystalline compared with the single crystal substrate, selective etching for the amorphous thin film is highly useful.

An optical waveguide device having a thin film lens with less coupling loss can be manufactured by heating the single crystal substrate having the amorphous ferroelectric thin film to obtain an epitaxial or uni-orientation first ferroelectric thin film of a lens shape by solid phase epitaxial growing and, further, growing an epitaxial or uni-orientation second ferroelectric thin film on the surface of the single crystal substrate and the first ferroelectric thin film for constituting an optical waveguide.

A preferred embodiment will be explained move concretely with reference to examples.

EXAMPLE 1

Figure 2:
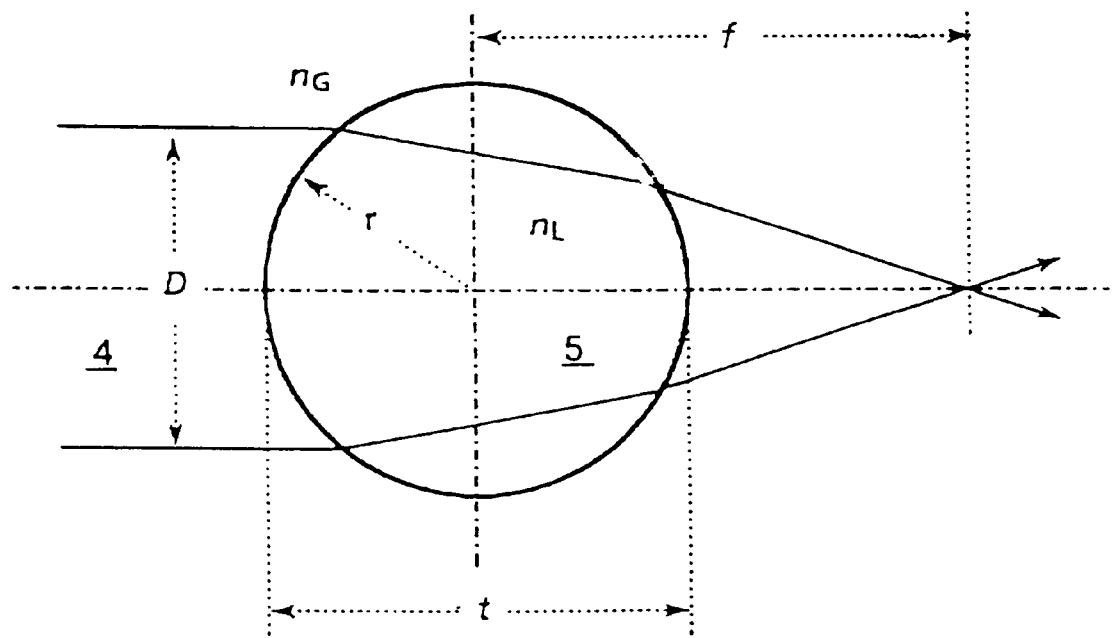
FIG. 2 is an upper plan view illustrating a structure of an optical waveguide device in Example 1 according to the first embodiment of the present invention.

In this example, a circular lens of 800 μm in diameter comprising, as shown in Table 1, a waveguide portion 4 of PLZT (9/65/35) thin film (film thickness=600 nm, n=2.49)/SrTiO$_3$ substrate (n=2.40), and a lens portion 5 of PLZT (9/65/35) thin film (film thickness=600 nm, n=2.49)/PZT (30/70) thin film (film thickness=500 nm, n=2.61)/SrTiO$_3$ substrate (n=2.40) and having a structure as shown in FIG. 1 and FIG. 2 was prepared and, further, a comb Al electrode was formed to the waveguide portion, to manufacture an optical switch based on the principle of an acousto-optic (AO) deflection device as shown in FIG. 10.

At first, anhydrous lead acetate Pb(CH$_3$COO)$_2$, zirconium isopropoxide Zr(O-i-C$_3$H$_7$)$_4$ and titanium isopropoxide Ti(O-i-C$_3$H$_7$)$_4$ were dissolved as starting materials in 2-methoxy ethanol and distilled and refluxed to finally obtain a precursor solution for PZT(30/70) at 0.6M of Pb concentration. Then, the precursor solution was spin-coated on a cleaned, etched and dried SrTiO$_3$ (100) single crystal substrate 2. Further, after elevating and keeping the temperature to 300° C. in an O$_2$ atmosphere, a power source for an electric furnace was turned off to allow cooling. By repeating the procedures five times, an amorphous PZT (30/70) thin film was obtained.

Then, after spin coating and prebaking an electron negative beam resist, electron beam exposure was applied to a circular lens shape of 800 μm in diameter. Then, circular lens shaped resist pattern was formed by applying post-baking and development. Further, after hard baking, the amorphous PZT (30/70) thin film was etched by an aqueous HCl solution to form an amorphous PZT (30/70) thin film of a circular lens shape. After peeling the circular lens shaped resist by a remover, solid phase epitaxial growing was conducted by elevating and keeping to 300° C. and then keeping to 650° C. in an O$_2$ atmosphere to form a first epitaxial PZT (30/70) thin film 1 of a circular lens shape of 500 nm in film thickness.

Then, anhydrous lead acetate Pb(CH$_3$OO)$_2$, lanthanum isopropoxide La(O-i-C$_3$H$_7$)$_3$, zirconium isopropoxide Zr(O-i-C$_3$H$_7$)$_4$ and titanium isopropoxide Ti(O-i-C$_3$H$_7$)$_4$ were dissolved as starting materials in 2-methoxy ethanol and distilled and refluxed to finally obtain a precursor solution for PLZT (9/65/35) at 0.6M of Pb concentration. Then, the precursor solution was spin-coated on an SrTiO$_3$ (100) single crystal substrate having an epitaxial PZT (30/70) thin film of a circular lens shape.

Further, solid phase epitaxial growing was conducted by elevating and keeping the temperature to 350° C. and then elevating and keeping to 750° C. in an O$_2$ atmosphere, and then turning off the power source for the electric furnace to allow cooling. By repeating the procedures six times, a second epitaxial PLZT (9/65/35) thin film 3 of 600 nm film thickness was formed. A structure of PLZT (100)//PZT (100)//SrTiO$_3$ (100) of uni-orientation and PLZT [001]//PZT [001]//SrTiO$_3$ [001] of plane orientation in view of the crystallographic relationship was obtained.

After poling the thin film optical waveguide, a comb Al electrode was formed on the optical waveguide of PLZT thin film to manufacture an AO deflection device.

At first, for evaluating the optical waveguide characteristic, an incident beam 8 at 633 nm was collimated through prism coupling into 0.4 mm, and introduced to the PLZT thin film optical guide 4 of this example, and the scattered light intensity distribution in the TE$_0$ mode in the light propagation direction was measured by an optical fiber. When a coupling loss for the sum of the incident coupling at the boundary between the waveguide portion 4 and the lens portion 5 and the emission coupling from the lens portion 5 was determined based on the inclination between the logarithm for the scattered light intensity and the optical propagation distance, it was found that characteristic was satisfactory as 0.78 dB (84% as coupling efficiency) which was substantially equal with the previously simulated value of 0.31 dB. The collimated light of 0.4 mm was focused at a focal distance of 4.5 mm and the F value was 11.3 showing the same condensing function as the designed value. Further, formation of multi-mode was not observed.

A laser beam at a wavelength of 633 nm was condensed to the end face of a channel waveguide 7 of the AO deflection device in this embodiment and introduced into the PLZT thin film optical guide 4. The incident beam 8, when emitted from the channel waveguide 7, diverged in the PLZT optical waveguide 4 and collimated to 0.4 mm after passing through the thin film lens 5. When a high frequency voltage was not applied to the comb Al electrode 6, the laser beam was condensed by passing through the second thin film lens 5 and formed an emission beam 9 emitting from the end face through the channel waveguide. When the high frequency voltage was applied to the comb Al electrode 6, a diffraction grating was formed by an acousto-optic effect, and the laser beam was deflected. The deflected laser beam, when passing through the second thin film lens 5, was condensed and then formed an emission beam 10 emitting from the end face through a channel waveguide adjacent with the channel waveguide described above.

Instead of the structure shown in FIG. 1 of this embodiment, a structure as shown in FIG. 12 may also be formed, for example, by polishing the upper surface of the substrate. In this case, excellent optical waveguide characteristic can be obtained since there is no unevenness on the boundary between the waveguide portion and the lens portion, while providing the same structure as that for Comparative Example 2 to be shown below.

Comparative Example 1

In this comparative example, a circular lens of 800 μm in diameter comprising a waveguide portion and a lens portion of PLZT (9/65/35) thin film (n=2.49)/SrTiO$_3$ substrate (n=2.40) and having a structure as shown in FIG. 2 and FIG. 11 was manufactured.

At first, in the same manner as in Example 1, a precursor solution for PLZT (9/65/35) at 0.6M of Pb concentration was spin-coated on a cleaned, etched and dried SrTiO$_3$ (100) single crystal substrate 2. Further, solid phase epitaxial growing was applied by elevating and keeping the temperature to 350° C. and then elevating and keeping the temperature to 750° C. in an O$_2$ atmosphere and turning off a power source for an electric furnace. By repeating the procedures six times, an epitaxial PLZT (9/65/35) thin film of 600 nm in thickness was formed.

Further, a precursor solution for PLZT (9/65/35) was spin-coated on the surface of the epitaxial PLZT (9/65/35) thin film, the temperature was elevated and kept to 350° C. in an $O_2$ atmosphere, the power source for the electric furnace was turned off to allow cooling. By repeating the procedures five times, an amorphous PLZT (9/65/35) thin film was obtained. Then, after spin coating an electron beam negative resist and applying prebaking, electron beam exposure was applied to a shape of a circular lens of 800 μm in diameter. Further, by applying post-baking and then development, a resist pattern of a circular lens shape was formed.

Further, after hard baking, the amorphous PLZT (9/65/35) thin film was etched in an aqueous HCl solution to form an amorphous PLZT (9/65/35) thin film of a circular lens shape. After peeling off a resist of the circular lens shape by a remover, solid phase epitaxial growing was conducted by elevating and keeping the temperature to 350° C. and then keeping it at 750° C. in an $O_2$ atmosphere to form an epitaxial PLZT (9/65/35) thin film in a circular lens shape of 500 nm in thickness. Thus, a waveguide portion 4 and a lens portion 5 were formed. A structure of PLZT (100)//SrTiO$_3$ (100) of uni-orientation and PLZT [001]//SiTiO$_3$ [001] plane orientation in the crystallographic relationship was obtained.

For evaluating the characteristic of the optical waveguide, a laser beam at 633 nm was collimated to 0.4 mm by prism coupling in the same manner as in Example 1, and introduced into the PLZT thin film optical waveguide of this comparative example, and the distribution of the scattered light intensity in the $TE_0$ mode along the light propagation direction was measured by an optical fiber. When a coupling loss for the sum of the incident coupling at the interface between the waveguide portion 4 and the lens portion 5, and an emission coupling from the lens portion was measured, it was found that the loss was as high as 7.3 dB (19% as coupling efficiency). Further, in this comparative example, the $TE_1$ mode was formed in the lens portion and two kinds of condensed light, namely, condensed light corresponding to the $TE_0$ mode and weak condensed light were observed as a result of weak coupling of the $TE_1$ mode in the lens portion with the $TE_0$ mode in the waveguide portion. Further, it was found that the light collimated to 0.4 mm was condensed only slightly, and the F value determined by calculation was 64.7 showing that the condensation performance was poor.

Comparative Example 2

In this Comparative Example 2, a circular lens of 800 μm in diameter comprising a waveguide portion 4 of PLZT (9/65/35) thin film (film thickness=600 nm, n=2.49)/SrTiO$_3$ substrate (n=2.40) and a lens portion 5 of PZT (30/70) thin film (film thickness=600 nm, n=2.61)/SrTiO$_3$ substrate (n=2.40) and having a structure as shown in FIG. 2 and FIG. 12 was manufactured.

At first, in the same manner as in Example 1, a precursor solution for PLZT (9/65/35) at 0.6M of Pb concentration was spin-coated on a cleaned, etched and dried SrTiO$_3$ (100) single crystal substrate 2. Further, solid phase epitaxial growing was conducted by elevating and keeping the temperature to 350° C. and then elevating and keeping the temperature to 750° C. in an $O_2$ atmosphere and then turning off a power source an the electric furnace to allow cooling. An epitaxial PLZT (9/65/35) thin film of 600 nm in thickness was formed by repeating the procedures six times.

Then, after spin-coating an electron beam positive resist and applying prebaking, an electron beam exposure was applied to a circular lens shape of 800 μm in diameter. Further, by applying post-baking and then development, a resist pattern of a circular lens shape window was formed. Further, after hard baking, the epitaxial PLZT (9/65/35) thin film was etched by an aqueous mixed solution of NH$_4$F/HF/HCl, to obtain a window of a circular lens shape.

Subsequently, an amorphous PZT (30/70) thin film was formed on the resist pattern formed with a lens shape window while keeping the substrate at a room temperature by use of a Pb excess PZT (30/70) ceramic target by an Rf magnetron sputtering method. Then, lift off was conducted by peeling the resist using a remover to form a structure in which only the inside of the circular lens shape window of the epitaxial PLZT (9/65/35) thin film was filled with the amorphous PZT (30/70) thin film. Further, the amorphous PZT (30/70) thin film was epitaxially grown in a solid phase by elevating and keeping the temperature to 650° C. in an $O_2$ atmosphere.

For evaluating the characteristic of the optical waveguide, a laser beam at 633 nm was collimated to 0.4 mm by prism coupling in the same manner as in Example 1, and introduced into the PLZT thin film optical waveguide and the distribution of the scattered light intensity in the $TE_0$ mode along the light propagation direction was measured by an optical fiber. When a coupling loss for the sum of the incident coupling at the interface between the waveguide portion 4 and the lens portion 5 and an emission coupling from the lens portion was measured, it was found that the loss was as high as 9.6 dB (11% as coupling efficiency) contrary to the expected value of 0.22 dB in the simulation. In order to examine the cause, when the boundary between the waveguide portion and the lens portion was observed by a scanning type electron microscope, unevenness and gaps were present at the boundary and, further, the film thickness was different between the waveguide portion and the lens portion. Further, when the cross section was observed by a transmission electron microscope, unevenness was formed on the surface of the substrate below the circular lens. It is considered that such a phenomenon increased the coupling loss. Further, the $TE_1$ mode was formed in the lens portion also in this comparative example, and two kinds of condensed light were observed, namely, condensed light corresponding to the $TE_0$ mode and weak condensed light as a result of weak coupling of the $TE_1$ mode in the lens portion with the $TE_0$ mode in the waveguide portion.

EXAMPLE 2

In this example, a pupil type lens having 800 μm of radius of curvature, comprising a waveguide portion 4 of PZT (52/48) thin film (film thickness =1000 nm, n=2.56)/SrTiO$_3$ substrate (n=2.40), and a lens portion 5 of PZT (52/48) thin film (film thickness=1000 nm, n=2.56)/PZT (30/70) thin film (film thickness=800 nm, n=2.61)/SrTiO$_3$ substrate (n=2.40) and having a structure as shown in FIG. 1 and FIG. 13 was manufactured.

At first, in the same manner as in Example 1, a precursor solution for PZT (30/70) was spin-coated on a cleaned, etched and dried SrTiO)$_3$ (100) single crystal substrate 2. Further, after elevating and keeping the temperature to 300° C. in an $O_2$ atmosphere, a power source for an electric furnace was tuned off to allow cooling. An epitaxial amorphous PZT(30/70) was obtained by repeating the procedures eight times. Then, after spin coating a positive resist and applying prebaking, UV-ray exposure was applied to a portion other than the pupil type lens shape, and development were applied to form a resist pattern of a pupil type lens shape.

Further, after post baking, the amorphous PZT (30/70) thin film was etched by an aqueous mixed solution of $HNO_3$/HCl to form a pupil type lens shape. After peeling the resist by a remover, solid phase epitaxial growing was conducted by elevating and keeping the temperature to 300° C. and then keeping to 650° C., to form a first epitaxial PZT (30/70) thin film 1 of 800 nm in thickness of a pupil lens shape.

Further, a precursor solution for PZT (52/48) obtained in the same manner as in Example 1 was spin-coated on the surface of the epitaxial PZT (52/48) thin film, and solid phase epitaxial growing was conducted by elevating and keeping the temperature to 350° C. and then elevating and keeping the temperature to 650° C. in an $O_2$ atmosphere and then turning off the power source for the electric furnace to allow cooling. An epitaxial PZT (52/48) thin film of 1000 nm in thickness was formed by repeating the procedures ten times. The waveguide portion 4 and the lens portion 5 were thus formed to obtain a structure of PZT (100)//PZT(100)// $SrTiO_3$ (100) of uni-orientation and of PZT [001]//PZT [001]//$SrTiO_3$[001] of plane orientation in the crystallographic relationship.

In the same manner as in Example 1, a laser beam at 633 nm was collimated to 0.4 mm by prism coupling and introduced into the PZT thin film optical waveguide in this example to measure the distribution of the scattered light intensity in the $TE_0$ mode along the light propagating direction by an optical fiber. It was found that the characteristic was satisfactory as 0.16 dB (96% as coupling efficiency) which was substantially equal with 0.10 dB as expected in the simulation, Further, the collimated light at 0.4 mm was condensed at a focal distance of 21.2 mm and it was found that the F value was 52.9, showing the same condensation performance as that of the designed value. Further, formation of multi-mode was not observed in the lens portion.

EXAMPLE 3

In this example, a semi-pupil type lens having a radius of curvature of 800 μm on one side, comprising a waveguide portion 4 of PLZT (9/65/35) thin film (film thickness=600 nm, n=2.49)/$SrTiO_3$ substrate (n=2.40), and a lens portion 5 of PLZT (9/65/35) thin film (film thickness=600 nm, n=2.49)/PZT (30/70) thin film (film thickness=600 nm, n=2.61)/$SrTiO_3$ substrate (n=2.40) and having a structure as shown in FIG. 1 and FIG. 14 was manufactured in the same manner as in Example 1.

At first, an amorphous PZT (30/70) thin film was obtained on an $SrTiO_3$ (100) single crystal substrate 2 by use of a precursor solution for PZT (30/70). Then, electron beam exposure was applied to a semi-pupil type lens shape by use of an electron beam negative resist to form a semi-pupil type lens shape resist pattern. After etching the amorphous PZT (30/70) thin film with an aqueous HCl solution and peeling the resist, a first epitaxial PZT (30/70) thin film 1 of a semi-pupil type lens shape of 600 nm in thickness was formed by solid phase epitaxial growing. Then, a precursor solution for PLZT (9/65/35) was spin-coated on the $SrTiO_3$ (100) single crystal substrate having the epitaxial PZT (30/70) thin film of the semi-pupil type lens shape, and a second epitaxial PLZT (9/65/35) thin film 3 of 600 nm in thickness was formed by solid phase epitaxial growing.

When a laser beam at 633 nm was collimated to 0.4 mm by prism coupling in the same manner as in Example 1 and introduced in the $TE_0$ mode to the PLZT thin film optical waveguide of this example, satisfactory coupling efficiency and a light condensation characteristic were observed.

EXAMPLE 4

In this example, a circular lens of 800 μm in diameter comprising a waveguide portion 4 of PZT (95/5) thin film (film thickness=500 nm, n=2.47)/MgO substrate (n=1.74) and a lens portion 5 of PZT (95/5) thin film (film thickness= 500 nm, n=2.47)/PZT (10/90) thin film (film thickness=400 nm, n=2.65)/MgO substrate (n=1.74) and having a structure as shown in FIG. 1 and FIG. 2 was manufactured.

At fist, an amorphous PZT (10/90) thin film was formed on an MgO (100) single crystal substrate 2 while keeping the substrate at a room temperature by use of a Pb excess PZT (10/90) ceramic target by Rf magnetron sputtering method. Then, after spin coating a negative resist and applying prebaking, UV-ray exposure was applied to a circular lens shape. Then, by applying development, a resist pattern of a circular lens shape was formed. Further, after post baking, the first amorphous PZT (10/90) thin film was etched by an aqueous mixed solution of $NH_4F$/HF/HCl to form a circular lens shape and the resist was peeled off by a remover.

Successively, after forming a first epitaxial PZT (10/90) thin film of a circular lens shape of 400 nm in thickness by solid phase epitaxial growing by elevating the substrate temperature to 600° C. in an Rf magnetron sputtering chamber, an epitaxial PZT (95/5) thin film of 500 nm in thickness was formed on an MgO substrate having an epitaxial PZT (10/90) thin film of a circular lens shape by use of a Pb excess PZT (95/5) ceramic target. The waveguide portion 4 and the lens portion 5 were thus formed to obtain a structure of PZT (100)//PZT (100)//MgO (100) of uni-orientation and PZT [001]//PZT [001]//MaO[001] of plane orientation in a crystallographic relationship.

In the same manner as in Example 1, a laser beam at 633 nm was collimated into 0.4 mm by prism coupling and introduced to the PZT thin film optical waveguide in this example to measure the distribution of the scattered light in the $TE_0$ mode along the light propagating direction by an optical fiber. It was found that the characteristic was satisfactory as 0.22 dB (95% as coupling efficiency) which was substantially equal with 0.08 dB as expected in the simulation. Further, the collimated beam of 0.4 mm was condensed at a focal distance of 3.0 mm and it was found that the F value was 7.4, showing the same light condensation performance as that of the designed value. Further, formation of multi-mode was not observed in the lens portion.

EXAMPLE 5

In this example, a circular lens of 800 μm in diameter comprising a waveguide portion 4 of $LiTaO_3$ thin film (film thickness=1000 nm, ne=2.180)/$Al_2O_3$ substrate (ne=1.760) and a lens portion 5 of $LiTaO_3$ thin film (film thickness=1000 nm, n=2.180)/$LiNbO_3$ thin film (film thickness=600 nm, ne=2.208)/$Al_2O_3$ substrate (ne=1.760) and having a structure as shown in FIG. 1 and FIG. 2 was manufactured.

At first, $LiOC_2H_5$ and $Nb(OC_2H_5)_5$ each of an equi-molar amount were dissolved as starting materials in 2-methoxy ethanol $CH_3OC_2H_4OH$, and distilled and refluxed to finally obtain a precursor solution for $LiNbO_3$ at 0.6M of Li concentration. Then, the precursor solution was spin-coated on a cleaned, etched and dried $Al_2O_3$ (0001) single crystal substrate 2. Further, after elevating and keeping the temperature to 300° C. in an $O_2$ atmosphere, a power source for an electric furnace was turned off to allow cooling. An amorphous LiNbO$_3$ thin film was obtained by repeating the procedures six times. Then, after spin coating and prebaking a negative resist, UV-ray exposure was applied to a circular lens shape of 800 μm in diameter. Further, development were applied successively to form a circular lens shape resist pattern.

Further, after post baking, the amorphous LiNbO$_3$ thin film was etched by an aqueous HCl solution to form an amorphous LiNbO$_3$ thin film of a circular lens shape. After peeling the circular lens shaped resist by a remover, solid phase epitaxial growing was conducted by elevating and keeping the temperature to 300° C. and then keeping to 700° C., to form a first epitaxial LiNbO$_3$ thin film 1 of a circular lens shape of 600 nm film thickness. Then, LiOC$_2$H$_5$ and Nb(OC$_2$H$_5$)$_5$ each in an equi-molar amount were dissolved as starting materials in 2-methoxy ethanol CH$_3$OC$_2$H$_4$OH, and distilled and refluxed to finally obtain a precursor solution for LiNbO$_3$ at 0.06M and 0.6M of Li concentration.

Then, the precursor solution of 0.06M was at fist spin-coated on the Al$_2$O$_3$ (0001) single crystal substrate having an epitaxial LiNbO$_3$ thin film of a circular lens shape. Further, solid phase epitaxial growing was conducted by elevating and keeping the temperature to 300° C. and then elevating and keeping the temperature to 700° C. in an O$_2$ atmosphere and then turning off the power source for the electric furnace to allow cooling. Then, the precursor solution at 0.6M was spin-coated and solid phase epitaxial growing was conducted by elevating and keeping the temperature to 300° C. and then elevating and keeping the temperature to 700° C. in an O$_2$ atmosphere and then turning off the power source for the electric furnace to allow cooling. A second epitaxial LiTaO$_3$ thin film 3 of 1000 nm in thickness was formed by repeating the procedures ten times.

In the same manner as in Example 1, a laser beam at 633 nm was collimated to 0.4 mm by prism coupling and introduced into the LiTaO$_3$ thin film optical waveguide in this example to measure the distribution of the scattered light in the TE$_0$ mode along the light propagating direction by an optical fiber. It was found that the characteristic was satisfactory as 1.25 dB (75% as coupling efficiency) which was substantially equal with 0.86 dB as expected in the simulation. Further, the collimated beam at 0.4 mm was condensed at a focal distance of 17.9 mm and it was found that the F value was 44.8, showing the same condensation performance as that of the designed value. Further, formation of multi-mode was not observed in the lens portion.

EXAMPLE 6

In this example, a concave lens having a radius of curvature of 800 μm on one side, comprising a waveguide portion 4 of PLZT (9/65/35) thin film (film thickness=600 nm, n=2.49)/PZT (30/70) thin film (film thickness=600 nm, n=2.61)/SrTiO$_3$ substrate (n=2.40) and a lens portion 5 of PZT (30/70) thin film (film thickness=600 nm, n=2.6)/SiTiO$_3$ substrate (n=2.40), with the effective refraction index of the lens portion being smaller than that of the thin film optical waveguide portion and having a structure as shown in FIG. 15 and FIG. 16 was manufactured.

At first, in the same manner as in Example 1, a precursor solution for PZT (30/70) thin film at 0.6M of Pb concentration was spin-coated on an SrTiO$_3$ (100) single crystal substrate 2 applied with cleaning, etching and drying. Further, after elevating and then keeping the temperature to 300° C. in an O$_2$ atmosphere, a power source for an electric furnace was turned off to allow cooling. An amorphous PZT (30/70) thin film was obtained by repeating the procedures six times. Then, after spin coating an electron beam positive resist and applying prebaking, electron beam exposure was applied to a concave lens shape having a radius of curvature of 800 μm on one side.

Further, by applying post-baking and then development, a window resist pattern of a concave lens shape was formed. Further, after hard baking, a window of a concave lens shape was formed to the amorphous PZT (30/70) thin film by etching the amorphous PZT (30/70) thin film by an aqueous HCl solution. After removing the resist of the window of the concave lens shape by a remover, solid phase epitaxial growing was conducted by elevating and keeping the temperature to 350° C. and then keeping to 750° C. in an O$_2$ atmosphere, to form a second epitaxial PZT (30/70) having a window of a concave lens shape of 600 nm thickness as the optical waveguide portion.

Then, a precursor solution for PLZT (9/65/35) at 0.6M of Pb concentration was spin-coated on the epitaxial PZT (30/70) thin film having a window of the concave lens shape. Further, solid phase epitaxial growing was conducted by elevating and keeping the temperature to 300° C. and then elevating and keeping the temperature to 650° C. in an O$_2$ atmosphere, and turning off the power source for the electric furnace to allow cooling. A first epitaxial PLZT (9/65/35) thin film 1 of 600 nm in thickness as the lens portion was formed by repeating the procedures six times.

When a laser beam at 633 nm was collimated to 0.4 mm by prism coupling in the same manner as in Example 1 and introduced in the TE$_0$ mode of the PLZT thin film optical waveguide of this example, satisfactory coupling efficiency and a condensation characteristic were observed.

EXAMPLE 7

In this example, a Fresnel lens comprising a waveguide portion 4 of PLZT (9/65/35) thin film (film thickness=600 nm, n=2.49)/SrTiO$_3$ substrate (n=2.40) and a lens portion 5 of PLZT (9/65/35) thin film (film thickness=600 nm, n=2.49)/PZT (30/70) thin film (film thickness=600 nm, n=2.61)/SiTiO$_3$ substrate (n=2.40), and having a structure as shown in FIG. 1 and FIG. 17 was manufactured in the same manner as in Example 1.

At first, an amorphous PZT (30/70) thin film was formed on an SrTiO$_3$ (100) single crystal substrate by use of a precursor solution for PZT (30/70). Then, a resist pattern of a Fresnel lens shape was formed by applying electron beam exposure to a Fresnel lens shape by use of an electron beam negative resist. After etching the amorphous PZT (30/70) thin film with an aqueous HCl solution and peeling the resist, a first epitaxial PZT (30/70) thin film 1 of a Fresnel lens shape of 600 nm in thickness was formed by solid phase epitaxial growing. Then, a precursor solution for PLZT (9/65/35) was spin-coated on the SrTiO$_3$ substrate having the epitaxial PZT (30/70) thin film of a Fresnel lens shape and a second epitaxial PLZT (9/65/35) thin film 3 of 600 nm thickness was formed by solid phase epitaxial growing.

When a laser beam at 633 nm was collimated to 0.4 mm by prism coupling in the same manner as in Example 1 and introduced in the TE$_0$ mode to the PLZT thin film optical waveguide of this example, satisfactory coupling efficiency and a condensation characteristic were observed.

EXAMPLE 8

In this example, a grating lens comprising a waveguide portion 4 of PLZT (9/65/35) thin film (film thickness=600 nm, n=2.49)/SrTiO$_3$ substrate (n=2.40) and a lens portion 5 of PLZT (9/65/35) thin film (film thickness=600 nm, n=2.49)/PZT (30/70) thin film (film thickness=600 nm, n=2.61)/SiTiO$_3$ substrate (n=2.40), and having a structure as shown in FIG. 1 and FIG. 18 was manufactured in the same manner as in Example 1.

At first, an amorphous PZT (30/70) thin film was formed on an SrTiO$_3$ (100) single crystal substrate by use of a precursor solution for PZT (30/70). Then, a resist pattern of a grating lens shape was formed by applying electron beam exposure to a grating lens shape by use of an electron beam negative resist. After etching the amorphous PZT (30/70) thin film by reactive ion etching with CCl$_2$F$_2$/O$_2$ gas mixture and peeling the resist, a first epitaxial PZT (30/70) thin film 1 of a grating lens of 600 nm in thickness was formed by solid phase epitaxial growing. Then, a precursor solution for PLZT (9/65/35) was spin-coated on the SrTiO$_3$ substrate having the epitaxial PZT (30/70) thin film of a grating lens shape and a second epitaxial PLZT (9/65/35) thin film 3 of 600 nm in thickness was formed by solid phase epitaxial growing.

When a laser beam at 633 nm was collimated to 0.4 mm by prism coupling in the same manner as in Example 1 and introduced in the TE$_0$ mode to the PLZT thin film optical waveguide of this example, satisfactory coupling efficiency and a condensation characteristic were observed.

EXAMPLE 9

In this example, a circular lens of 800 µm in diameter coming a waveguide portion 4 of LiNbO$_3$ thin film (film thickness=900 nm, ne=2.208)/Al$_2$O$_3$ substrate (ne=1.760) and a lens portion 5 of LiNbO$_3$ thin film (film thickness=900 nm, n=2.208)/Ti-doped LiNbO$_3$ thin film (film thickness=800 nm, ne=2.230)/Al$_2$O$_3$ substrate (ne=1.760) and having a structure as shown in FIG. 1 and FIG. 2 was manufactured in the same manner as in Example 5.

At first, a Ti-doped amorphous LiNbO$_3$ thin film was formed on an Al$_3$O$_3$ (0001) single crystal substrate by use of a precursor solution for LiNbO$_3$ with addition of Ti alkoxide. Then, UV-ray exposure was applied to a circular lens shape of 800 µm in diameter by use of a negative resist to form a resist pattern of a circular lens shape. After etching the Ti-doped amorphous LiNbO$_3$ film with an aqueous HCl solution and peeling the resist, a Ti-doped epitaxial LiNbO$_3$ thin film 1 of a circular lens shape of 600 nm in thickness was formed by solid phase epitaxial growing. Then, a precursor solution for LiNbO$_3$ was spin-coated on the Al$_2$O$_3$ (0001) single crystal substrate having the Ti-doped epitaxial LiNbO$_3$ thin film of a circular lens shape and a second epitaxial LiNbO$_3$ thin film of 1000 nm in thickness was formed by solid phase epitaxial growing.

When a laser beam at 633 nm was collimated to 0.4 mm by prism coupling in the same manner as in Example 1 and introduced in the TE$_0$ mode to the LiNbO$_3$ thin film optical waveguide of this example, satisfactory coupling efficiency and a condensation characteristic were observed.

EXAMPLE 10

A circular lens of 800 µm in diameter comprising a waveguide portion 4 of PLZT (9/65/35) thin film (film thickness=600 nm, n=2.49)/PZT (90/10) thin film (film thickness=300 nm, n=2.48)/Nb-doped SrTiO$_3$ substrate (n=2.40) and a lens portion 5 of PLZT (9/65/35) thin film (film thickness=600 nm, n=2.49)/PZT (30/70) thin film (film thickness=500 nm, n=2.61)/PZT (90/10) thin film (film thickness=300 nm, n=2.48)/Nb-doped SrTiO$_3$ substrate (n=2.40) in which a PZT (90/10) buffer layer 11 was introduced and having a structure as shown in FIG. 1 and FIG. 2 was manufactured in the same manner as in Example 1 and, further, a prism type ITO electrode was formed in the waveguide portion to manufacture a prism type EO deflection device.

At first, a precursor solution for PZT (90/10) was spin-coated on a cleaned, etched and dried Nb-doped SrTiO$_3$ (100) single crystal substrate 2. Further, solid phase epitaxial growing was conducted by elevating and keeping the temperature to 300° C. and then elevating and keeping the temperature to 750° C. in an O$_2$ atmosphere and then turning off a power source for an electric furnace to allow cooling. An epitaxial PLZT (90/10) thin film 11 as a buffer layer of 300 nm in thickness was formed by repeating the procedures three times.

Then, a precursor solution for PZT (30/70) was spin-coated on the PZT (90/10) buffer layer 11. Further, the temperature was elevated and kept to 300° C. in an O$_2$ atmosphere and then the power source for the electric furnace was turned off to allow cooling. An amorphous PZT (30/70) thin film was obtained by repeating the procedures five times. Then, after spin coating an electron beam negative resist and applying prebaking, electron beam exposure was applied to a circular lens shape of 800 µm in diameter. Further, a resist pattern of a circular lens shape was formed by applying post-baking and then development. Further after hard baking, the amorphous PZT (30/70) thin film was etched with an aqueous HCl solution to form an amorphous PZT (30/70) thin film of a circular lend shape. After peeling the resist of a circular lens shape by a remover, solid phase epitaxial growing was conducted by elevating and keeping the temperature to 300° C. and then keeping to 650° C. in an O$_2$ atmosphere to form a first epitaxial PZT (30/70 ) thin film 1 of a circular lens shape of 500 nm in thickness.

Then, a precursor solution for PLZT (9/65/35) was spin-coated on an SrTiO$_3$ (100) single crystal substrate having an epitaxial PZT (30/70) thin film of a circular lens shape. Further, solid phase epitaxial growing was conducted by elevating and keeping the temperature to 350° C. and then elevating and keeping the temperature to 750° C. in an O$_2$ atmosphere and then tuning off the power source for the electric furnace to allow cooling. A second epitaxial PLZT (9/65/35) thin film 3 of 600 nm in thickness was formed by repeating the procedures six times. A structure of PLZT (100)//PZT (100)//PZT (100)//Nb-doped SrTiO$_3$ (100) of uni-orientation and PLZT[001]//PZT[001]//PZT[001]//Nb-doped SrTiO$_3$ [001] of plane orientation, in a crystallographic relationship was obtained.

A prism type upper electrode having a base of 500 µm and a height of 1000 µm was formed by a lifting off method from an ITO thin film of 100 nm in thickness formed by an Rf sputtering method on the PLZT thin film optical waveguide to mange a prism type EO deflection device. Further, an ohmic contact was obtained by In on the rear side of the Nb-doped SrTiO$_3$ substrate.

When a laser beam at 633 nm was collimated to 0.4 mm by prism coupling in the same manner as in Example 1 and introduced in the TE$_0$ mode to the PLZT thin film optical waveguide of this embodiment, optical propagation loss due to the substrate was scarcely observed and satisfactory coupling efficiency and a condensation characteristic due to the thin film were observed. Further, when a voltage is applied between the lower Nb-doped SrTiO$_3$ substrate electrode and the upper ITO prism electrode, a high effective voltage can be applied to the optical waveguide even when the buffer layer was introduced in which a different refractive index was formed between a portion below the prism electrode and other portion s by the electro-optical effect and the laser beam was deflected at high efficiency.

As described above, according to the present invention, it is possible, for the first time, to dispose a waveguide lens having a satisfactory optical characteristic and productivity to an optical waveguide of an epitaxial ferroelectric thin film having a high characteristic in an optical waveguide device, and it is possible to utilize such a waveguide lens in various types of deflection devices, switching devices or modulation devices having the optical waveguide structure.

What is claimed is:

1. An optical waveguide device comprising:
    a first epitaxial or uni-orientation ferroelectric thin film disposed on a surface of a single crystal substrate and formed into a lens shape to constitute a lens portion and
    a second epitaxial or uni-orientation ferroelectric thin film disposed on said single crystal substrate to constitute an optical waveguide portion and comprising a material or a composition different from that of said first ferroelectric thin film,
    wherein an optical beam incident to said optical waveguide portion is controlled by utilizing the difference of effective refractive index between said lens portion and said optical waveguide portion and,
    wherein a thickness of said first ferroelectric thin film is smaller than a thickness of said second ferroelectric thin film and larger than a cut-off film thickness for an optical waveguide to said first ferroelectric thin film.

2. The optical waveguide device as defined in claim 1, wherein said first ferroelectric thin film and said second ferroelectric thin film have a refractive index greater than that of said single crystal substrate.

3. The optical waveguide device as defined in claim 1, wherein said first ferroelectric thin film has a refractive index greater than that of said second ferroelectric thin film.

4. The optical waveguide device as defined in claim 1, wherein said second ferroelectric thin film is disposed between said single crystal substrate and said first ferroelectric thin film.

5. The optical waveguide device as defined in claim 4, wherein said second ferroelectric thin film has a refractive index greater than that of said first ferroelectric thin film.

6. The optical waveguide device as defined in claim 1, wherein an oxide buffer layer having a refractive index smaller than that of said first ferroelectric thin film and said second ferroelectric thin film is disposed between said first ferroelectric thin film and said second ferroelectric thin film.

7. The optical waveguide device as defined in claim 1, which further comprises a deflection device for deflecting light incident to said optical waveguide portion.

8. An optical waveguide device comprising:
    a first epitaxial or uni-orientation ferroelectric thin film disposed on a surface of a single crystal substrate and formed into a lens shape to constitute a lens portion; and
    a second epitaxial or uni-orientation ferroelectric thin film disposed over said first ferroelectric thin film to constitute an optical waveguide portion and comprising a material or a composition different from that of said first ferroelectric thin film,
    wherein an optical beam incident to said optical waveguide portion is controlled by utilizing the difference of effective refractive index between said lens portion and said optical waveguide portion.

9. The optical waveguide device as defined in claim 8, wherein said first ferroelectric thin film and said second ferroelectric thin film have a refractive index greater than that of said single crystal substrate.

10. The optical waveguide device as defined in claim 8, wherein said first ferroelectric thin film has a refractive index greater than that of said second ferroelectric thin film.

11. The optical waveguide device as defined in claim 8, wherein the thickness of said first ferroelectric thin film is smaller than the thickness of said second ferroelectric thin film and larger than a cut-off film thickness for an optical waveguide to said first ferroelectric thin film.

12. The optical waveguide device as defined in claim 8, wherein said second ferroelectric thin film has a refractive index greater than that of said first ferroelectric thin film.

13. The optical waveguide device as defined in claim 12, wherein the thickness of said second ferroelectric thin film is smaller than the thickness of said first ferroelectric thin film and larger than a cut-off film thickness for an optical waveguide to said second ferroelectric thin film.

14. The optical waveguide device as defined in claim 8, wherein an oxide buffer layer having a refractive index smaller than that of said first ferroelectric thin film and said second ferroelectric thin film is disposed between said first ferroelectric thin film and said second ferroelectric thin film.

15. The optical waveguide device as defined in claim 8, which further comprises a deflection device for deflecting light incident to said optical waveguide portion.

16. The optical waveguide device as defined in claim 8, wherein the substrate further includes a third epitaxial or uni-orientation ferroelectric thin film on a surface of the substrate.

17. The optical waveguide device as defined in claim 8, wherein the substrate further includes a third epitaxial or uni-orientation ferroelectric thin film on a surface of the substrate.

18. The optical waveguide device as defined in claim 17, wherein said first ferroelectric thin film and said second ferroelectric thin film have a refractive index greater than that of said single crystal substrate.

19. The optical waveguide device as defined in claim 17, wherein said first ferroelectric thin film has a refractive index greater than that of said second ferroelectric thin film.

20. The optical waveguide device as defined in claim 17, wherein the thickness of said first ferroelectric thin film is smaller than the thickness of said second ferroelectric thin film and larger than a cut-off film thickness for an optical waveguide to said first ferroelectric thin film.

21. The optical waveguide device as defined in claim 17, wherein said second ferroelectric thin film has a refractive index greater than that of said first ferroelectric thin film.

22. The optical waveguide device as defined in claim 21, wherein the thickness of said second ferroelectric thin film is smaller than the thickness of said first ferroelectric thin film and larger than a cut-off film thickness for an optical waveguide to said second ferroelectric thin film.

23. The optical waveguide device as defined in claim 8, wherein an oxide buffer layer having a refractive index smaller than that of said first ferroelectric thin film and said second ferroelectric thin film is disposed between said first ferroelectric thin film and said second ferroelectric thin film.

24. The optical waveguide device as defined in claim 23, which further comprises a deflection device for deflecting light incident to said optical waveguide portion.

25. An optical waveguide device comprising:
a first epitaxial or uni-orientation ferroelectric thin film disposed on a surface of a single crystal substrate and formed into a lens shape to constitute a lens portion; and
a second epitaxial or uni-orientation ferroelectric thin film disposed on said single crystal substrate to constitute an optical waveguide portion and comprising a material or a composition different from that of said first ferroelectric thin film,
wherein a thickness of said first ferroelectric thin film is smaller than a thickness of said second ferroelectric thin film and larger than a cut-off film thickness for an optical waveguide to said first ferroelectric thin film,
wherein at least a portion of the first epitaxial or uni-orientation ferroelectric thin film is embedded in the second epitaxial or uni-orientation ferroelectric thin film and an optical beam incident to said optical waveguide portion is controlled by utilizing the difference of effective refractive index between said lens portion and said optical waveguide portion.

* * * * *